United States Patent
Jaeger

(10) Patent No.: US 12,124,818 B1
(45) Date of Patent: Oct. 22, 2024

(54) SYSTEM AND METHOD FOR THE UTILIZATION OF RECIPROCAL PROGRAMMING IN A COMPUTING SYSTEM

(71) Applicant: Dennis Jaeger, Lafayette, CA (US)

(72) Inventor: Dennis Jaeger, Lafayette, CA (US)

( * ) Notice: Subject to any disclaimer, the term of this patent is extended or adjusted under 35 U.S.C. 154(b) by 0 days.

(21) Appl. No.: 17/896,560

(22) Filed: Aug. 26, 2022

Related U.S. Application Data

(60) Provisional application No. 63/238,102, filed on Aug. 27, 2021.

(51) Int. Cl.
*G06F 8/30* (2018.01)

(52) U.S. Cl.
CPC ..................... *G06F 8/31* (2013.01)

(58) Field of Classification Search
None
See application file for complete search history.

(56) References Cited

U.S. PATENT DOCUMENTS

| | | | |
|---|---|---|---|
| 5,418,941 A | 5/1995 | Peters | |
| 5,991,534 A | 11/1999 | Hamilton et al. | |
| 7,039,833 B2 | 5/2006 | Knuutila et al. | |
| 7,346,890 B1 * | 3/2008 | Geisinger | G06F 8/36 717/114 |
| 7,730,462 B2 * | 6/2010 | Grieskamp | G06F 8/31 717/136 |
| 8,352,907 B2 | 1/2013 | Kettley et al. | |
| 9,479,389 B2 | 10/2016 | Brittenham et al. | |
| 9,740,458 B1 * | 8/2017 | Black | G06F 8/31 |
| 2004/0024846 A1 | 2/2004 | Randall et al. | |
| 2007/0094592 A1 | 4/2007 | Turner et al. | |
| 2007/0117083 A1 | 5/2007 | Winneg et al. | |
| 2007/0288885 A1 * | 12/2007 | Brunel | G06F 8/10 717/104 |
| 2010/0050083 A1 | 2/2010 | Axen et al. | |
| 2011/0167069 A1 | 7/2011 | Libich | |
| 2011/0298596 A1 | 12/2011 | Warrick | |
| 2013/0297723 A1 | 11/2013 | Iwaniszyn | |
| 2013/0307796 A1 | 11/2013 | Liu et al. | |
| 2014/0022920 A1 | 1/2014 | Dua et al. | |
| 2015/0095882 A1 | 4/2015 | Jaeger et al. | |
| 2016/0049004 A1 * | 2/2016 | Mullins | G09G 3/001 345/419 |

FOREIGN PATENT DOCUMENTS

CN 112346711 A * 2/2021

OTHER PUBLICATIONS

Techcrunch, "VC Josh Stein talks power dynamics: 'I don't think this has been a mustache-twisting moment for investors'", retrieved from the internet on Jul. 14, 2012 at https://techcrunch.com/2020/07/16/vc-josh-stein-talks-power-dynamics-i-dont-think-this-has-been-a-mustache-twisting-moment-for-investors/, (2012), 10 pgs.
Finley, Klint, "What Exactly Is GitHub Anyway?", Jul. 14, 2012, https://techcrunch.com/2012/07/14/what-exactly-is-github-anyway/ (Year: 2012).

* cited by examiner

*Primary Examiner* — Ryan D. Coyer
(74) *Attorney, Agent, or Firm* — LOZA & LOZA, LLP; Thomas H. Ham

(57) ABSTRACT

Methods and systems define an operational methodology for a relationship-based programming tool and use the operational methodology to operate the relationship-based programming tool.

4 Claims, 30 Drawing Sheets

FIG. 2A
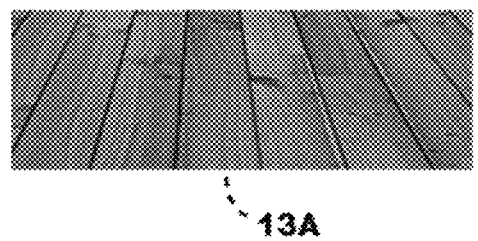
FIG. 2B
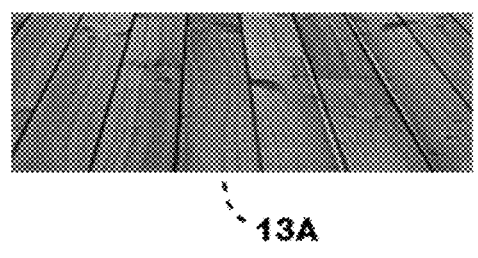
"Represent the above texture with the following gesture." 14
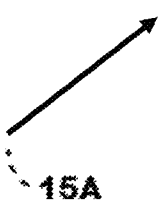
15A "Fill the room with this texture."

FIG. 11
"Give me the melting of ice on a hot surface." -- 26
↳ Melting 1 -- 27
FIG. 12
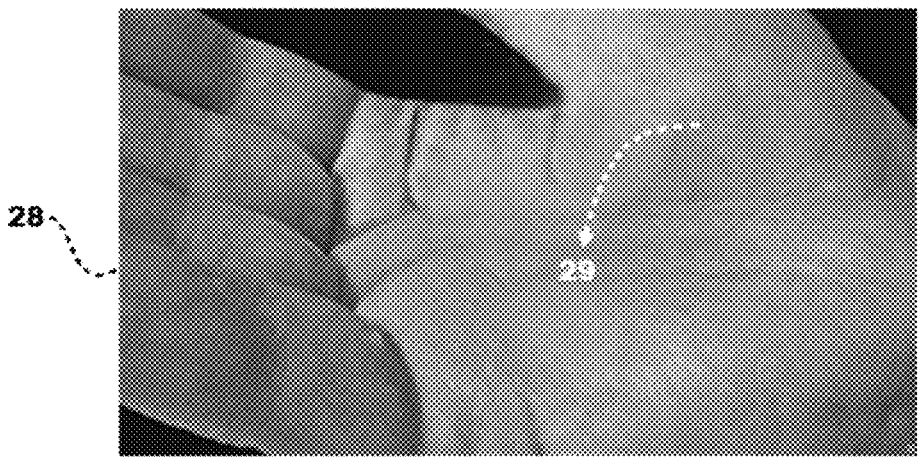
28
"Make 'Melting 1' cause anything I put here to melt." -- 30
FIG. 13
28
"Apply the following meaning to *My Hand*: any substance contacting *My Hand* is made to melt regardless of its melting temperature." -- 34

"Designate Sharp Cliff as a Relationship-Based Programming Tool"

"Make 'Gesture Tool 1' an equivalent for Sharp Cliff."

"Gesture Tool 1"

Waffle head

Smooth head

*Physical characteristics:*

A ball-peen hammer head has two ends: (a) a smaller round head, its pein, and (b) a larger flat head.

The steel of the ball-peen hammer's head is harder than that of a claw hammer, so it's less likely to chip on impact.

A ball-peen hammer's head ranges in weight from 4 ounces to 32 ounces.

FIG. 47

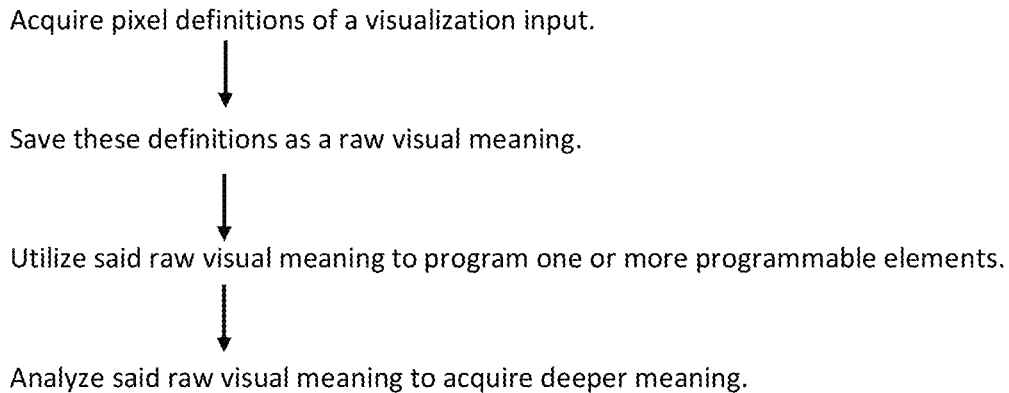

Acquire pixel definitions of a visualization input.

Save these definitions as a raw visual meaning.

Utilize said raw visual meaning to program one or more programmable elements.

Analyze said raw visual meaning to acquire deeper meaning.

FIG. 48

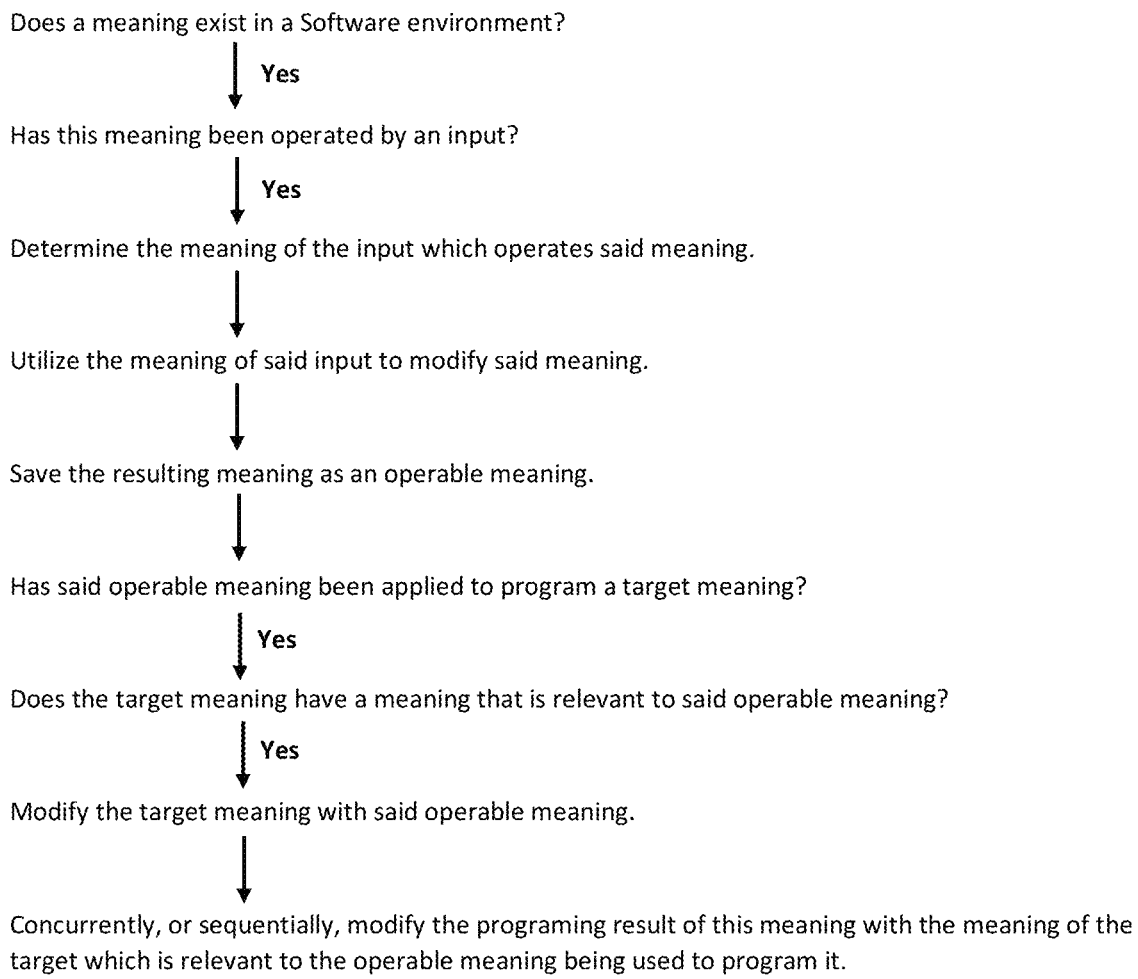

Does a meaning exist in a Software environment?
| Yes

Has this meaning been operated by an input?
| Yes

Determine the meaning of the input which operates said meaning.

Utilize the meaning of said input to modify said meaning.

Save the resulting meaning as an operable meaning.

Has said operable meaning been applied to program a target meaning?
| Yes

Does the target meaning have a meaning that is relevant to said operable meaning?
| Yes Modify the target meaning with said operable meaning.

Concurrently, or sequentially, modify the programing result of this meaning with the meaning of the target which is relevant to the operable meaning being used to program it.

FIG. 50

*The* | ← Drawn vertical line 10 cm from the letter "T."

FIG. 51

The idea of this article is to explore the different habits of people who have always lived in a city.

FIG. 52

The idea of this article is to explore the different habits of people who have always lived in a city.

The types of habits to be explored include the following: (a) frequenting coffee establishments, (b) eating evening meals in a restaurant, (c) attending movies in a theater.  ← Second paragraph created by hitting the Enter Key.

FIG. 53

The idea of this article is to explore the different habits of people who have never lived in a city.

Ayren touches here and drags downward.

The types of habits to be explored include the following: (a) frequenting coffee establishments, (b) eating evening meals in a restaurant, (c) attending movies in a theater.
→ Programmed space between

SYSTEM AND METHOD FOR THE UTILIZATION OF RECIPROCAL PROGRAMMING IN A COMPUTING SYSTEM

CROSS-REFERENCE TO RELATED APPLICATIONS

This applications claims priority from U.S. Provisional Patent Application Ser. No. 63/238,102, filed on Aug. 27, 2021, the contents of which are incorporated herein by reference. U.S. Provisional Patent Application Ser. No. 63/238,102 relates to U.S. patent application Ser. No. 17/347,935, filed on Jun. 15, 2021, which is a continuation application of U.S. patent application Ser. No. 16/897,700, which is a continuation-in-part application of U.S. patent application Ser. No. 16/522,583, filed on Jul. 25, 2019, which is a continuation application of U.S. patent application Ser. No. 16/289,595, filed on Feb. 28, 2019, which is a continuation-in-part application of U.S. patent application Ser. No. 15/486,247, filed on Apr. 12, 2017, which is entitled to the benefit of U.S. Provisional Patent Application Ser. No. 62/339,725, filed on May 20, 2016, and is a continuation-in-part application of U.S. patent application Ser. No. 15/015,076, filed on Feb. 3, 2016, which is (a) a continuation-in-part application of U.S. patent application Ser. No. 14/624,539, filed on Feb. 17, 2015, which is a continuation-in-part application of U.S. patent application Ser. No. 14/479,240, filed on Sep. 5, 2014, which is entitled to the benefit of U.S. Provisional Patent Application Ser. No. 61/874,901, filed on Sep. 6, 2013, U.S. Provisional patent application Ser. No. 61/874,908, filed on Sep. 6, 2013, and U.S. Provisional patent application Ser. No. 61/954,575, filed on Mar. 17, 2014, and is also (b) entitled to the benefit of U.S. Provisional Patent Application Ser. No. 62/217,586, filed on Sep. 11, 2015, U.S. Provisional Patent Application Ser. No. 62/249,937, filed on Nov. 2, 2015, and U.S. Provisional Patent Application Ser. No. 62/272,591, filed on Dec. 29, 2015. The above Patent Applications are all incorporated herein by reference.

SUMMARY

This disclosure includes systems and methods for the operation of "Relationship-Based Programming Tools," which are defined by characteristics, relationships and meaning at one or more points in time. These tools can be operated by any external or internal input understood by the Software of this invention. The operation of these tools confirms or modifies their meaning, referred to herein as an "operable meaning."

Further, when an operable meaning is applied to program a target, certain of the meanings of said target which have relevance to the operable meaning being used to program said target, modify the result of said operable meaning's programming. A relationship-based programming tool is also referred to herein as a "Meaning Programming Tool" and as a "Reciprocal Programming Tool."

BRIEF DESCRIPTION OF THE DRAWINGS

FIG. 2A depicts a wood texture content.

FIG. 2B depicts an instruction for the purpose of programing an equivalent for a meaning.

FIG. 11 depicts the naming of a meaning content.

FIG. 12 depicts the selection of a Software content.

FIG. 13 illustrates the establishing of a reciprocal programming relationship between three contents.

FIG. 47 defines the analysis of pixel definitions to create a raw visual meaning which is further analyzed to acquire deeper meaning in accordance with an embodiment of the invention.

FIG. 48 is a flowchart defining the operations of reciprocal programming in accordance with an embodiment of the invention.

FIG. 50 depicts a result of drawing a vertical line to the right of a text character.

FIG. 51 depicts an example of a first text wrap.

FIG. 52 depicts a result of creating a second paragraph.

FIG. 53 depicts a result of a "Ripple" function and increasing of the spacing between two paragraphs.

RELATIONSHIP-BASED PROGRAMMING TOOLS

Figure 1:
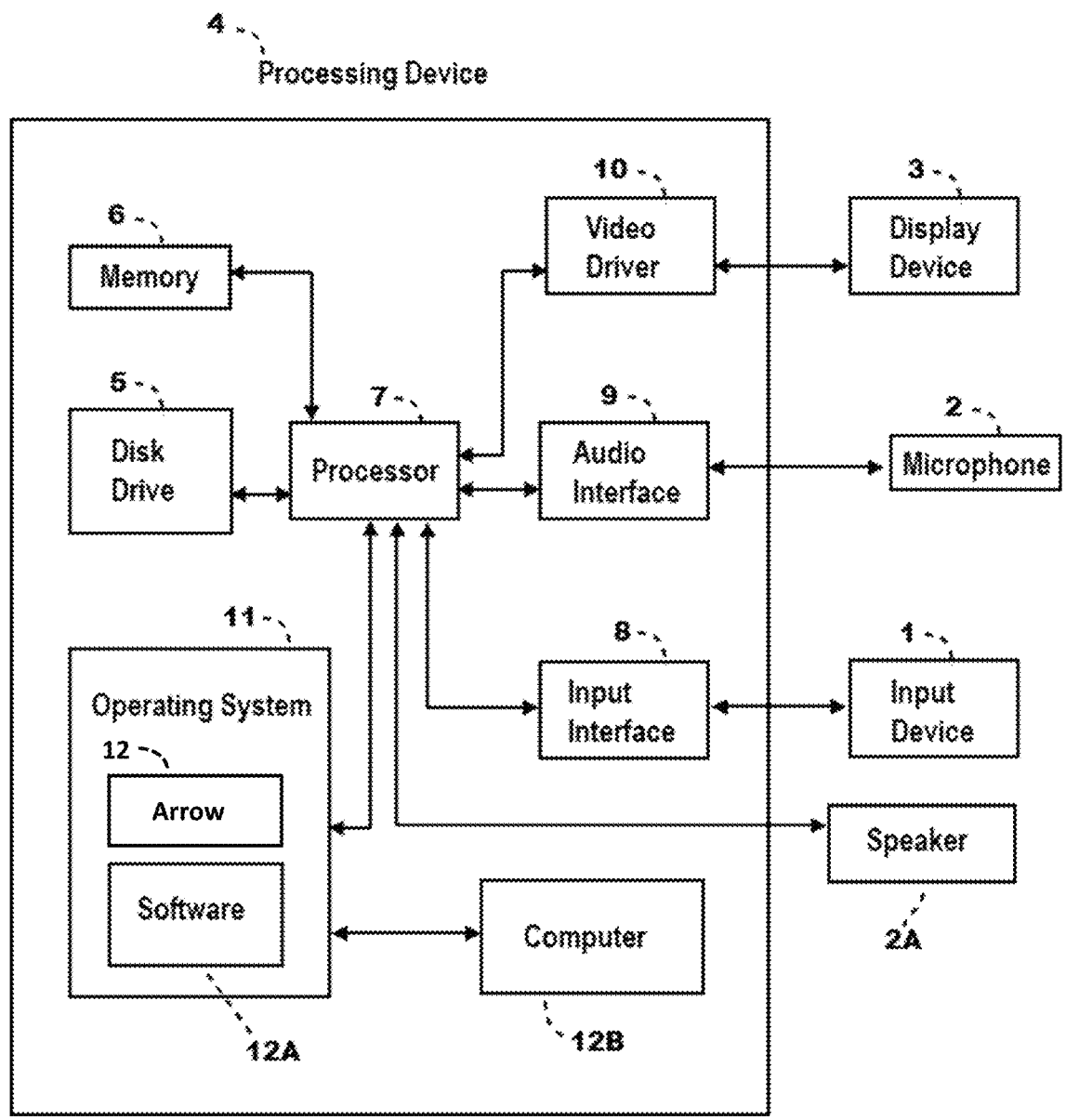
FIG. 1 is a block diagram depicting a computer system capable of carrying out the operations of the present invention.

In a key embodiment of the invention, relationship-based programming tools are user-defined, and as a result, have an infinite scope of operability. Users of a relationship-based programming tool can name it, or create any equivalent to represent it, which equivalent can be directly operated to create an operable meaning for said tool and apply said operable meaning to a target. The users of relationship-based programming tools are free to define their own unique operational methodologies and use these methodologies to operate reciprocal programming tools at any point in time.

A relationship-based programming tool can be applied to any valid target via any user operation that can be understood and/or carried out by the Software. These operations include, but are not limited to: (a) verbal inputs, (b) text inputs, (c) drawn inputs, (d) gestural inputs, (e) illustrations, and (f) environmental inputs, which include but are not limited to, the meaning of any data, item, construct, element, content and any equivalent in an analog or digital environment, and (g) future inputs presented via brain machine interfaces or their equivalents. These user inputs express the outflow of a user's thoughts which, when understood by the Software system are translated to instructions which are enacted via a computer, or any equivalent, or according to any means known to the art. In one embodiment of the invention, the programming of a relationship-based programming tool contains the following meaning processes:

A meaning is operated by an external or internal input that is understood by the Software.

The operation of this meaning alters its meaning, which is referred to an "operable meaning."

This operable meaning is used to program a target.

The meaning of the target relevant to the operable meaning being used to program it, alters the result of the operable meaning used to program the target.

In another embodiment of the invention, a concept content is operated by a user input with the following conditions: (a) when a user operates a concept content to program a target, the means by which the user operates this concept content's meaning modifies said meaning, (b) this modified meaning is used to program the target's meaning, and (c) the meaning of said target relevant to the user modified concept content's meaning, alters the result of the modified concept's content meaning's programming of the target.

In another embodiment of the invention, a meaning programming tool is assigned to a concept content with the following conditions: (a) when this concept content is used to program a target, the means of its operation modifies the concept content's meaning, (b) this modified meaning is used to program the target's meaning, and (c) the meaning of the target relevant to the modified programming meaning of the concept content, alters the result of the modified meaning applied to the target.

The operation of a meaning programming tool can be according to any meaning understood by the Software. This includes: (a) via any recorded meaning, (b) via any known meaning, (c) via any meaning accessible to the Software, (d) via a context, (d) via a digital or analog instruction, whose meaning is understood by or can be carried out by the Software, (f) via a timed event, (g) via a software construct, (h) via a user input, and any other characteristic, relationship or meaning known to or that can be enacted by the Software.

In another embodiment of the invention, a tool (a meaning) is operated, it is applied to another meaning (a target). The operation of this tool modifies its own meaning (creating an "operable meaning"). This operable meaning is used to program a target. At the same time, the meaning of this target, which is relevant to the operable meaning being used to program it, modifies the result of the operable meaning's programming of the target. In this way, the meaning of a tool is modified by its operation to program a target. But at or about the same time, the meaning of the target that is relevant to the operable meaning being used to program it, alters the result of said operable meaning's programming of said target.

In another embodiment of the invention, a user-named version of a relationship-based programming tool is used to modify one or more target via drawn inputs. In this case, the shape and direction of a user's input to a target determines the shape of the programming tool (the meaning being operated by the user). This is not just about drawing a graphic shape. It's about using the direction and shape and dimension of an input to program the viewing angle, shape and other attributes of a gesture tool's meaning, which in turn programs a target's meaning. For example, as a user gestures along a path of any shape, the meaning controlled by this gesture (e.g., the meaning assigned to an operated concept content) is both programmed by the shape of the user's gesture, and is used to program the characteristics, relationships and meaning defining a target impinged by this gesture. Further, the meaning applied by the operation of the operable meaning of this concept content to a target is modified by the target's meaning that is relevant to the operable meaning applied to program the target. This tool can have any name or be represented by any equivalent.

Of note, a meaning can be comprised of multiple meanings. In one embodiment of the invention, the utility of a relationship-based programming tool is proportional to the amount of detailed information it contains, relevant to the applicability of its meaning to a target's meaning.

In another embodiment of this invention, a meaning programming tool has relationships to operational aspects that further define its own meaning at points in time when combined with the meaning of a target. A meaning programming tool has a relationship to the means by which it is applied to a target. In one approach, this is a form of a context-of-use. This context-of-use can further define the scope of a meaning's applicability to a target, including the result of its applicability to said target. As an example, consider the meaning of a twin engine prop plane landing on an airstrip. The specifics of the meaning of the plane's landing operation are different from the motion of the flying plane in an atmosphere. However, the motion of the plane is a part of its total landing meaning, which includes every meaning of the plane applicable to its ability to fly and safely land.

This includes: the type of plane; the power of the plane; the plane's use of a yaw damper and other wing mechanisms when in flight; the angle at which the plane approaches a runway; the air speed it maintains during its final approach; the weight of the plane; the physical attributes of its wheels and landing gear; the application of brakes after landing; the method of stalling the engine during landing, and more.

This meaning of a plane landing on an airstrip has a relationship to every aspect that defines the plane, e.g., its operation, the airstrip, atmospheric conditions and a host of other meanings. This includes the timing of certain aspects. For example, the meaning of a plane coming in and landing on an airstrip has a relationship to its point of touch down. The touch down is a meaning. This meaning includes the nature of the plane's landing gear and the angles of its wheels to the landing surface. It includes how these wheels impact the landing surface. How they skid on the surface. The amount of compression applied to each wheel from the force of the landing impact. The wheel's rotational weight, rotational speed, and so on.

All the knowledge relevant to a twin engine plane making a landing, is a part of the comprehensive meaning of the landing of this kind of plane, hereinafter referred to as, "T Landing." Now consider an environment media whose "State 1" presents a Beechcraft G58 Baron twin engine plane in an instance of flight high over a city. Let's call this content, G58 Baron. Let's say a user applies "T Landing" to program G58 Baron with the following instruction: "Use 'T Landing' to program G58 Baron to land on this runway." As a part of this instruction, the user shows the Software a media ("Runway media") which presents a runway.

Of note, "T Landing" is the meaning of an operation, not the physical meaning of a specific plane. According to the above instruction, the Software programs the landing of G58 Baron with the "T Landing" meaning, as a relationship-based programming tool. As a result of this programming, the landing meaning of G58 Baron becomes the landing meaning of "T Landing." But the meaning "T Landing" doesn't replace the identity meaning of G58 Baron. It remains a Beechcraft G58 Baron aircraft. By this means, the meaning of "T Landing's" target, G58 Baron, modifies certain aspects of the meaning of "T Landing."

According to the above user's instruction, G58 Baron is programmed to fly according to the flight defined by "T Landing." As it approaches the Runway media runway, G58 Baron lowers its landing gears in the time frame defined by "T Landing". But it's the G58 Baron's landing gears that are operated. The programming of G58 Baron with "T Landing" causes G58 Baron to bank at the right time and align itself to the descent path of "T Landing." Everything that defines the meaning of "T Landing" is applied to the landing operation of G58 Baron. "T Landing" controls G58 Baron's wind speed, its use of flaps, ailerons, when its landing gears come down. Its nose is angled up as its back two wheels hit the airstrip first. Then its nose moves down enabling its front wheel to make contact with the airstrip surface. "T Landing" defines the timing and force applied to G58 Baron's brakes, and every other aspect of this landing procedure.

But the specific hardware and software being operated on the G58 Baron plane is defined by the meaning of G58 Baron, which is defined by the design specifications of the Beechcraft G58 Baron. The controls and all plane mechanisms are that of G58 Baron.

But the operations of these elements, as they pertain to the G58 Baron's landing, are programmed by the meaning "T Landing." Of note, the full meaning of the Beechcraft G58 Baron would include every specification defining this plane, including the full contents and meaning of its operating manual. Every aspect of this information relevant to the landing of G58 Baron on an airstrip is controlled, but not replaced, by the meaning of "T Landing."

The Software of this invention provides for an infinite scope of relationships between inputs and these inputs' operations of computing elements. In a key embodiment, the Software performs analytical, reasoning, programming and other functions, which, in part, are purposed to enhance and support a user's own thought processes.

In one approach, the methodology of the Software is at least partly formed by individually conceived and communicated user operations of characteristics, relationships and/or meaning. In this approach, the operability of the Software is unique to each individual, not controlled by protocols universal to a Software product.

In a further embodiment of the invention, the Software environment, its means of operation, and its content are fully definable by user input, including from a consumer-level user. This input can originate from a physical analog or digital environment. In one approach, the Software analyzes this input and determines its task or purpose. In other words: "what is the user doing at a point in time, what is the purpose or task being performed, all or in part, by user inputs at points in time?"

In another Software embodiment, the Software derives characteristics from its analysis of one or more user inputs and uses these characteristics to program digital data.

In a key application of the Software, it is constantly being purposed to understand what task is being performed at each point in time by each user of the Software. According to this application, a relationship-based programming tool's programming is directed by a user's operation of it.

Definition of Terms in this Disclosure Defined by their Use or Association with the Software Element: When used in association with a programmable element, the term "element" references a programmable element's existence, functioning, operation and the like. When used in association with another term, the term "element" references that term. When the term "element" is not referencing a specific term, its meaning is according to its context of use, in which case the term "element" can be interpreted according to one or more of the following meanings: (a) a visual, functional, and/or conceptual existence, (b) an object, (c) a component or constituent of a whole, (d) all or a part or an aspect of something, or any equivalent.

Content: Unless specifically designated as such, the meaning of the term "content" in this disclosure is not limited to a presentation of one or more programmable elements. Depending on its context of use, the term "content" can be used to denote any visual, functional or conceptual manifestation (either visible or invisible) of the Software. Both visible and invisible Software content can be operated by any valid input to the Software, including user input.

Concept content: the term "concept content" includes in part: ideas, thoughts, conceptualizations, emotions, functionalities, operations, and concepts, e.g., time, order, chaos, position, dimension, context, ways of doing things, actions, and more. For example, "assignment" is a concept content.

The meaning of something can be a concept content (also referred to as a "meaning content"). A concept content can be something that cannot be seen by the human eye, for example, what happens when one breathes helium, or the idea of crushing something. A concept content can be defined by characteristics, relationships and meaning at any point in time.

Generally, the characteristics, relationships and meaning defining concept content have primary relationships to each other. And these elements have primary or secondary relationships to characteristics, relationships and meaning defining other content having at least one relationship to a concept content.

A Software concept content, with or without a visible component, can be operated and used to program another concept content, with or without a visible component.

Data: the term "data" is sometimes used to denote the phrase "characteristics, relationships and/or meaning," or the phrase "characteristics, relationships and meaning." Other uses of the term "data" in certain contexts, include, visual, functional and/or conceptual meaning or the equivalent.

Software: all references to the term "Software", with a capital "S", refer to the Software of this invention. This use of the term Software includes all processing capabilities attributed to the Software as referred to herein, and as known to the art. Said Software capabilities include the ability to receive and communicate characteristics, relationships and meaning directly, both internally and externally to and from the Software system, and via any valid data, including programmable elements or any equivalent. Said capabilities include: the ability to perform task analysis, relationship analysis, plus all forms of comparative analysis, shape, pattern and other forms of recognition analysis, analytical processing, inference, deduction, programming, deep-learning, machine learning and any other functioning of an artificial intelligence system, or an equivalent, including learning, cognitive awareness, reasoning and language meaning, said capabilities include, but are not limited to, search, digital image processing, statistical analysis, biomedical analysis, spectral density estimation and human reasoning emulation. In a key Software embodiment, said capabilities are purposed, in whole or in part, to enhance and support a Software user's own thought process Referring to FIG. 1, an example of a computer system for providing the computer environment in which the invention operates includes an input device 1, a microphone 2, a display device 3 and a processing device 4. Although these devices are shown as separate devices, two or more of these devices may be integrated together. The input device 1 allows a user to input commands into the system to, for example, draw and manipulate one or more arrows. The input device 1 includes a computer keyboard and a computer mouse. However, the input device 1 may be any type of electronic input device, such as buttons, dials, levers and/or switches, camera, motion sensing device input and the like on the processing device 4. Alternatively, the input device 1 may be part of the display device 3 as a touch-sensitive display that allows a user to input commands using a finger, a stylus or devices. The microphone 2 is used to input voice commands into the computer system. The display device 3 may be any type of a display device, such as those commonly found in personal computer systems, e.g., cathode-ray tube (CRT) monitors or liquid-crystal display (LCD) monitors.

In one embodiment, the processing device 4 of the computer system includes a disk drive 5, memory 6, a processor 7, an input interface 8, an audio interface, 9, and a video driver, 10. The processing device 4 can include: any combination of Central Processing Units (CPUs) and/or Graphics Processing Unit (GPUs) (including multi-core GPUs based systems), servers, Field Programmable Gate Arrays (FPGAs), or an equivalent. In some embodiments this processing can support a Blackspace User Interface System (UIS) 11, which includes an arrow logic module, 12. The Blackspace "UIS" provides the computer operating environment in which arrow logics are used. The arrow logic module 12 performs operations associated with arrow logic as described herein. In one embodiment, the arrow logic module 12 is implemented as software. However, the arrow logic module 12 may be implemented in any combination of hardware, firmware and/or software.

In one embodiment, disk drive 5, the memory 6, the processor 7, the input interface 8, the audio interface 9 and the video driver 10 are components that can be found in personal computers. In another embodiment, equivalents of one or more of these items exist as functional devices, processes, operational meaning, or any equivalent, (including virtual embodiments) empowered by or existing as a function of one or more cloud computing systems, including supercomputers. The disk drive 5 provides a means to input data and to install programs into the system from an external computer readable storage medium. As an example, the disk drive 5 may an solid-state drive (SSD) or other solid-state device. The memory 6 is a storage medium to store various data utilized by the computer system. The memory may be a hard disk drive, and/or any device for storing and retrieving data, including dynamic random access memory (DRAM), Static random-access memory (SRAM), Flash or other forms of memory. The processor 7 may be any type of digital signal processor, including the arrow logic module 12. The input interface 8 provides an interface between the processor 7 and the input device 1. The audio interface 9 provides an interface between the processor 7 and the microphone 2 so that use can input audio or vocal commands. The video driver 10 drives the display device 3. In order to simplify the figure, additional components that are commonly found in a processing device of a personal computer system are not shown or described.

The following is a discussion of the Software's recreation of non-Software image data In one Software embodiment, the recreation of a non-Software content as a Software content, including the processing of this content, occurs within the Software and/or associated processing services. In one approach, the Software's processing operates according to the following: characteristics define relationships which define meaning, and meaning defines relationships which define characteristics.

In certain instances, characteristics can directly define certain meaning. In the discussion below, characteristics are used to define raw visual meaning.

Consider the ingest of a 4K jpeg image ("My Car") to the Software and its recreation as a Software content.

In one approach, to accomplish this, the Software assesses the number of pixels comprising My Car. The Software reasons, how many pixels are in a 4K image? This depends on its context-of-use. Cinema 4K is 4096×2160 pixels which equals 8,847,360 pixels—about 8.8 megapixels. 4K (Ultra high-definition (HD)), commonly used for images downloaded from the internet, is 3840×2160 pixels, which equals 8,294,400 pixels—about 8.3 megapixels.

How does the Software recreate these megapixels as a Software content? There are a near infinite number of methods to accomplish this task. Here are three: (a) recreate the jpeg image via meaning known to the Software, (b) acquire the individual definition of each pixel comprising an Ultra HD version of the ingested jpeg image, and (c) apply a combination of "a" and "b."

In one approach, the Software takes the bit depth, hue, saturation, color, transparency and position, and any other defining attribute ("pixel definition"), of a pixel located in the upper-most left corner of the 8,294,400 pixel array comprising the 4K jpeg image, My Car, and saves it as part of a raw visual meaning (VM) ("Raw VM-1"). As a part of this process, to enable a user to see the results of the Software's programming, the Software programs a first programmable element with this pixel's raw visual meaning.

Continuing with this approach, the Software takes the pixel definition of each next pixel in this 8,294,400 pixel array and saves it as part of Raw VM-1

When Raw VM-1 contains 8,294,400 raw visual meanings, it's an exact visual recreation of the jpeg image My Car. In one approach, this content resides within the Software as a History of Change. As such, a user can't see it.

In order to enable a user of the Software to see the results of the Software's programming, said each next pixel definition is used to program a corresponding programmable element. According to this approach, as the Software creates Raw VM-1, it also creates 8,294,400 programmable elements presenting this same raw visual meaning, which a user can both see and operate.

Of note, as an alternate, the Software could create a single programmable element, or any organization of programmable elements, and program it or them with the composite raw visual meaning of Raw VM-1.

The meaning, Raw VM-1, is defined by characteristics which were defined by the pixel definitions of 8,294,400 pixels of the 4K image My Car.

In one embodiment of the invention, at the point of the creation of Raw VM-1, the Software does not analyze Raw VM-1's characteristics for relationships and deeper meaning. In another embodiment, this analysis takes place upon a user's request. In an alternate embodiment, the Software performs an automatic analysis of the raw visual meaning of Raw VM-1, based on any causal event, condition, concept, directive or any equivalent. In this case and in the case of a user request for analysis, the raw visual meaning, Raw VM-1, is analyzed by the Software and/or an associated service. And from this analysis, the Software derives relationships which define deeper meanings of Raw VM-1.

In one embodiment, the Software performs three programming operations either sequentially, concurrently or via a combination of the two:
  (a) It acquires pixel definitions of a non-Software content and saves these definitions as a raw visual meaning.
  (b) It uses this raw visual meaning to program one or more programmable elements which present this visual meaning to the user.
  (c) It analyzes its acquired raw visual meaning to acquire deeper meaning.

Recreating an MP4 4K Video as a Software Content

This example references a cinema 4K MPEG-4 Part 14 (MP4) video, called "Hiking Angel Mountain." It contains 4096×2160 pixels, 8.8 megapixels, with an aspect ratio of 1:1.85. A single frame of a cinema 4K video has 8,847,360 sets of pixel definitions. Like the pixels defining non-Software image data, each video pixel's definition includes at least the following attributes: bit depth, hue, saturation, color, transparency and position. Let's say Hiking Angel Mountain is 10 seconds in length. At 30 fps, that's 300 frames. This equals 2,654,208,000 sets of pixel definitions.

These pixel definitions define the visual meaning of each frame of this video. When this video is initially recreated as a Software content, referred to herein as: "Mountain Hiker," it consists of 300 instances of change (there are no frames). The visual meaning of each instance of change is limited to the characteristics defining each pixel's definition for each frame in the original 4K MP4 video, Hiking Angel Mountain. These definitions are referred to herein as raw visual meaning.

Where does the programmable element fit into this? In one Software embodiment, a programmable element is a software construct. As such, it is a conceptual tool which could be comprised of any number of individual elements. There could be 8,294,400 programmable elements, where each element presents the raw visual meaning of one of the 8,294,400 pixels defining Hiking Angel Mountain. Or the 8,294,400 pixel definitions presenting Hiking Angel Mountain could define a single programmable element, and anything in between.

Once these pixel definitions are used to define a Software content, they are no longer points in a raster image, comprising a video frame. They are characteristics, which can be analyzed by the Software to define relationships and meaning. In one approach, to preserve Software resources, this analysis is not conducted automatically. It is the result of an input, the most common source, but no means the only source, is a Software user. In a key embodiment, this analysis results in the discovery of relationships having relevance to the input. In another embodiment, this analysis results in a comprehensive discovery of relationships comprising a detailed meaning of all acquired raw visual meaning.

In one embodiment, regarding the analysis of a Software content which has recreated a formatted video (e.g., an MP4, .AVI, .MOV, and more), the relationships between the raw visual meanings initially defining this Software content are discovered by the Software as the result of a user's input. In another embodiment, the relationships between the raw visual meanings initially defining a Software content are discovered by the Software via a context, timed event, software input, or any other non-user initiated input recognized by the Software.

In one approach, the above described processes are carried out completely within the Software, which does not require programmable elements for analysis and the programming of data.

Of note, the fact that these characteristics are part of a meaning which defines a Software content, connects these characteristics to each other. And these connections define relationships.

In further consideration of the 8,294,400 pixel definitions defining a raw visual meaning, as a raw visual meaning only, the extent of this meaning is limited to the factors that defined each pixel in the original non-Software content recreated as a Software content. These factors include: bit depth, hue, saturation, color, transparency position and other inherent factors, if any.

But there are potentially billions of relationships to be discovered. There are relationships between every visual, functional, and conceptual meaning. In one Software embodiment, the discovery of these relationships is triggered by a user's operation of a Software content and/or by a user's instruction, pertaining to a specific Software content. In another embodiment, the discovery of these relationships is triggered by an event, condition, primary relationship, or any other valid input to the Software system.

In summary, in a key Software embodiment, the ingest of any formatted video (e.g., MP4, MOV, AVI, WMV) results in the acquisition of the collective raw visual meaning of each frame of the ingested video. This raw visual meaning can be used as a Software content, or analyzed for deeper meaning, which potentially increases the content's effectiveness in programming other content.

Referring now to FIG. 2A, a content 13A, is presented to the Software by any suitable means. Said suitable means include, in part: (a) presenting an analog image of content 13A, to the digital camera input of the device being used to operate the Software, (b) presenting a digital image of content 13A to the Software, and (c) providing a description of the content via written and/or verbal means.

The content pictured in FIG. 2A is a wood texture defined by certain properties, which include in part: the raw visual meaning of this content, which defines laterally placed wooden boards, with a brown toned wood grain, viewed from an oblique angle of approximately 30° above the surface of 13A, positioned approximately perpendicular to its central axis.

In FIG. 2B, an instruction 14, presented via a verbal input to the Software, is used to create an equivalent 15A, for content 13A. Said equivalent is an operational gesture that presents a directional indicator of any length, angle, shape, dimension and other properties. The operation of equivalent 15A, modifies various characteristics, relationships and meaning of content 13A, based on the operated characteristics, relationships and meaning of equivalent 15A. Said operation of 15A, creates an operable meaning of content 13A. The operated characterisitics, relationships and meaning of 15A, modify the characterisitics, relationships and meaning defining content 13A, as an operable meaning.

Figure 3:
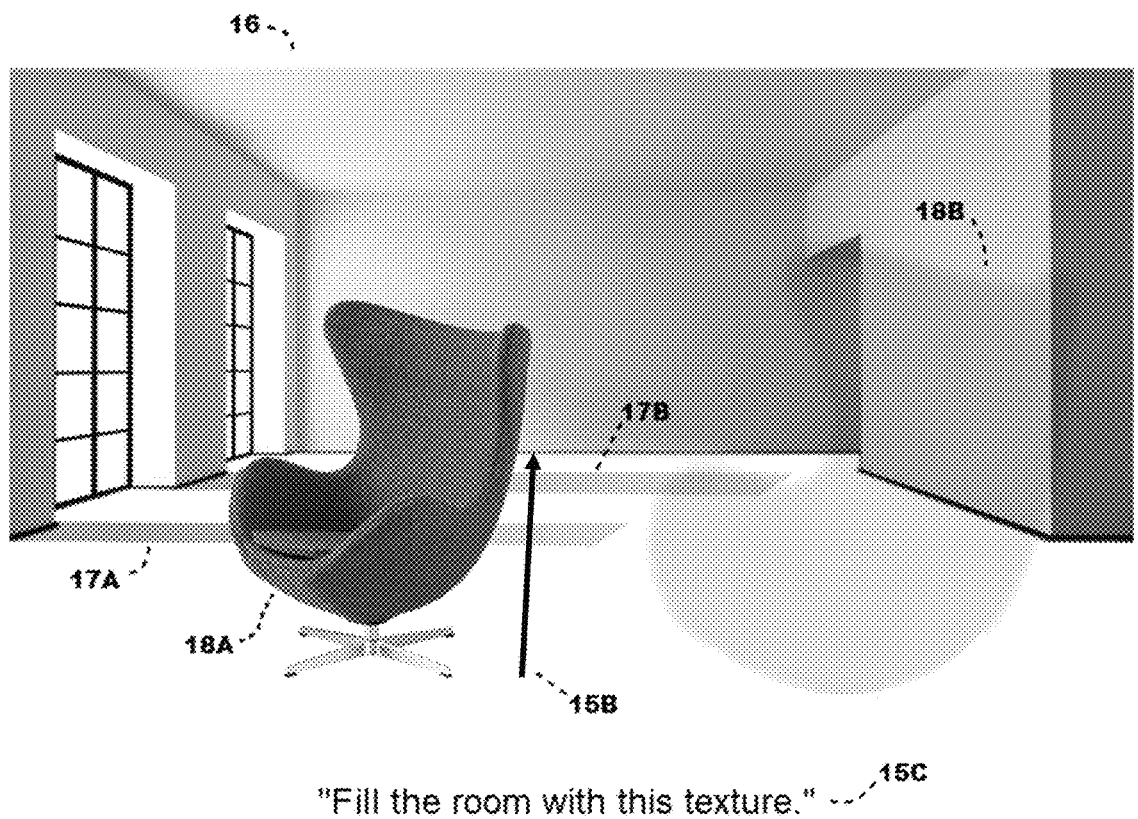
FIG. 3 presents a first operable meaning applied to a target.

In FIG. 3, an input 15B, performs at least three tasks: (a) it operates content 13A, via an operation of its programmed equivalent 15A, (b) said operation of content 13A, modifies 13A's meaning, creating an operable meaning of content 13A, and (c) said operable meaning of content 13A, is applied to program a target 16, a room with shadows, 17A and 17B, and a shadow 18B, of a red chair 18A.

There are at least four interrelated meanings here:
(a) The characterisitics, relationships and meaning that define content 13A.
(b) The user's operation of equivalent 15A (operated as 15B in FIG. 3), of content 13A, which modifies the data defining content 13A, as an operable meaning of 13A.
(c) The operable meaning of content 13A being applied to program target 16.
(d) The meaning of target 16, relevant to the operable meaning of content 13A, being applied to target 16, to program it.

Further regarding FIG. 3, content 13A acts as a relationship-based programming tool. The operation of equivalent 15A (operated as 15B in FIG. 3), programs the operable meaning of content 13A, by the following means:
(a) An instruction 15C, (via text or verbal means) is presented to the Software: "Fill the room with this texture." The term "this texture" refers to content 13A.
(b) A gesture 15B, is inputted to target 16, starting to the right of chair 18A, and ending at the base of the rear wall of target 16.

Figure 4:
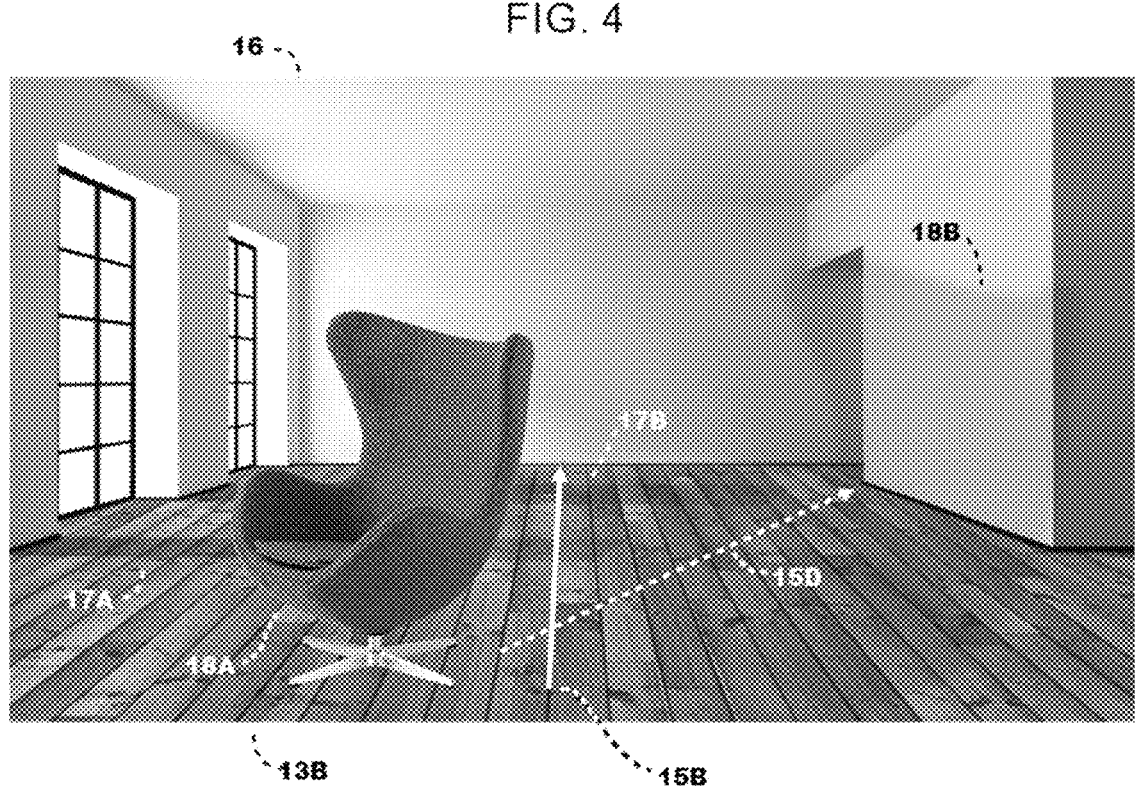
FIG. 4 depicts the result of the application of a first operable meaning to a target.

FIG. 4 illustrates the result of the programming of target 16, with the operable meaning of the content/the relationship-based programming tool 13A, via input 15B, as depicted in FIG. 3. As a part of the programming of target 16, with the operable meaning of content 13A, the meanings of target 16, relevant to the operable meaning applied to program it, modify the result of said operable meaning's programming of target 16. These relevant target 16, meanings include, in part: (a) the general topology of the room, (b) the room's viewing angle, (c) the room's perspective, and (d) the lighting of the room which produces shadows on the floor and walls of the room.

In one embodiment of the invention, relevant target meanings are automatically used to modify the operable meaning used to program said target. In another embodiment of the invention, the modifying of the operable meaning being applied to target 16, is enacted via an input. This input could be according to a programmed context, an on-the-fly user instruction, or any other causal event recognized by the Software.

As a result of the reciprocal programming illustrated in FIG. 4, the texture 13A, is used to replace the blank floor of target 16. The perspective of target 16, the shapes of its walls, its viewing angle, viewing perspective, and the presence of shadows on its floor and walls are all part of the relevant meaning of target 16, which modifies the result of the programming of target 16, with the operable meaning of content 13A, enacted by input 15B.

Figure 5:
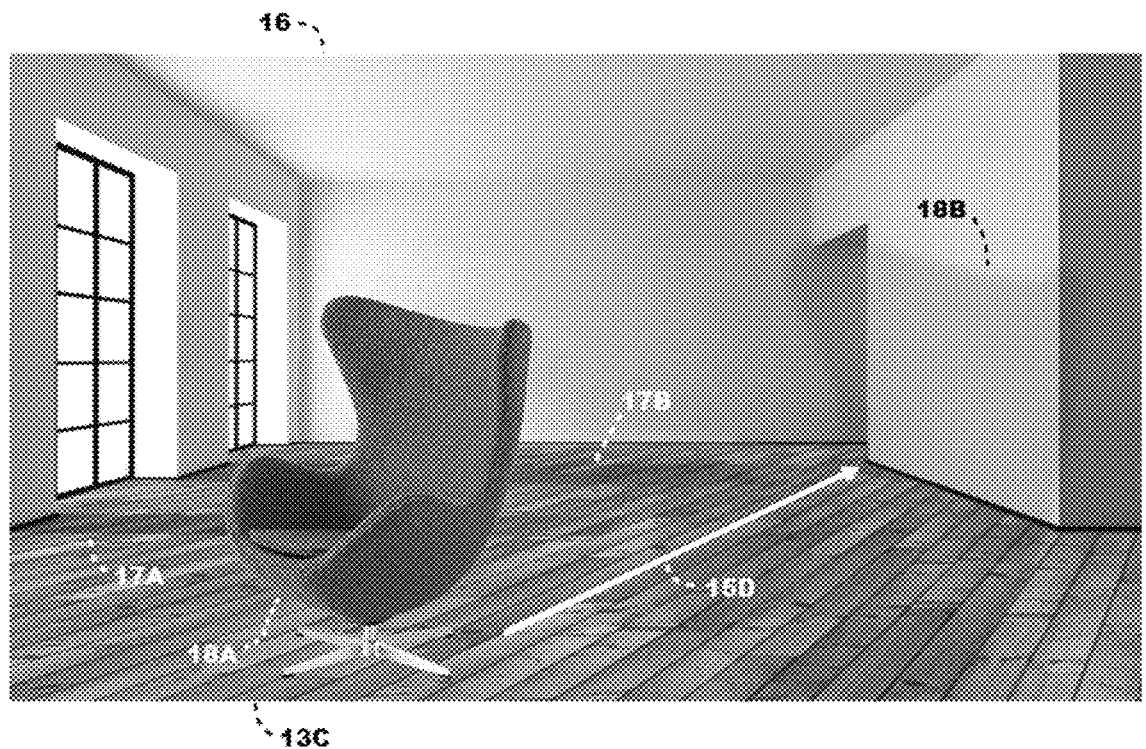
FIG. 5 depicts the result of a second operable meaning applied to a target.

FIG. 5 illustrates a new input 15D, which operates the equivalent 15A in a new fashion. Input 15D, with an oblique angle to target 16's right side wall, modifies the operational definition of the previous operable meaning (15B as shown in FIG. 4) of content 13A, resulting in an alteration of this relationship-based programing tool. The operation of 15D, modifies the data defining content 13A, to create a new operable meaning for this content.

In summary, FIG. 5 illustrates three interrelated meanings of a relationship-based programming tool.

They are:
(a) The operation of the equivalent 15A, as 15D, to program target 16, creates a new operable meaning for the content 13A. Methods of the programming of target 16, via an input to the Software, include but are not limited to, the following: (i) drawing an arrow graphic as depicted by 15D, (ii) presenting a verbal instruction describing the 15C input to target 16, which is automatically carried forth into the new operation of this equivalent as 15D, (iii) presenting written text describing the 15C input to target 16, and (iv) showing the Software an illustration of the inputted arrow to the floor of target 16, shown as 15D, in FIG. 4.
(b) The operable meaning of content 15A (as created in "a" above) programs target 16.
(c) The meaning of target 16, relevant to the operable meaning being used to program it, modifies this operable meaning's perspective, viewing angle, focus and other relevant meanings.

Of note, when the floor texture data defining target 16, is programmed by the new operable meaning programmed by the input 15D, the primary relationships of the shadows 17A, 17B and 18B, relevant to the programming of target 16, with said new operable meaning, are automatically applied to program the result of the programming of target 16, with said new operable meaing programmed by the input 15D.

Of further note, target 16's reciprocal programming of the result of content 13A's modified operable meaning's programming of target 16, ("Result 1") is completed by the Software applying aspects of target 16's meaning relevant to the operable being used to program target 16, to modify "Result 1."

Figure 6:
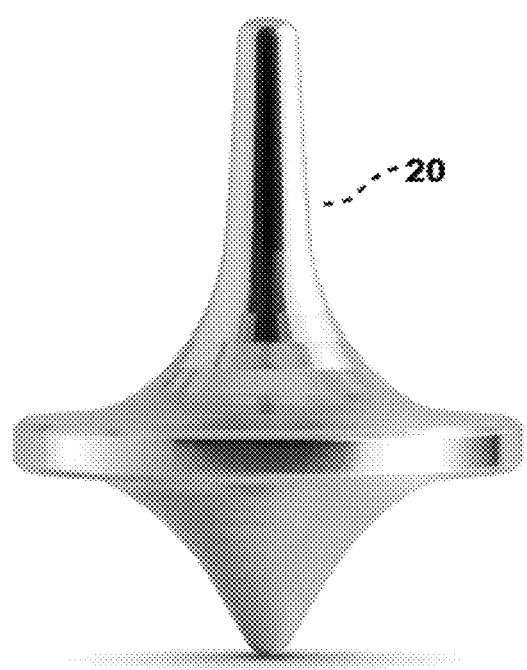
FIG. 6 presents a spinnable top element in a stationary, vertical position.

FIG. 6, shows a spinnable top 20, presented in a stationary, vertical position. This element is defined by visual, functional and conceptual meanings. A key aspect of its conceptual meaning is 360° rotation, ("360° Rotation").

The following is a discussion of the conceptual meaning "360° Rotation" operated as a relationship-based programming tool.

By any means disclosed herein or known to the art, a user assigns "360° Rotation" to an in-the-air circular motion of their hand. As a result, the shape delineated by the user's hand motion programs a shape meaning for "360° Rotation." This hand motion along a 2D axis produces a 2D, "360° Rotation" shape meaning. This hand motion along a 3D axis produces a 3D, "360° Rotation" shape meaning. A clockwise or counter-clockwise rotational meaning is programmed for "360° Rotation" according to the rotational direction of this user's in-the-air hand gesture. The speed of the user's in-the-air gesture determines the speed of "360° Rotation."

There are many ways to assess the user operations of the above defined equivalent for "360° Rotation." These include in part, any of the following:

(a) The collective of a user's operations of "360° Rotation" programs its operable meaning at the point(s) in time of the user's in-the-air operation(s).
(b) The first complete 360° user gesture defines an operable meaning for "360° Rotation."
(c) The average of multiple 360° user in-the-air gestures programs an operable meaning for "360° Rotation."
(d) Multiple real time in-the-air user gestures program a changeable operable meaning for "360° Rotation."

As an example only, let's say a user operates "360° Rotation" via a counter-clockwise in-the-air circular hand gesture. Further, let's say this user's in-the-air hand gesture is equal to two, 360° counter-clockwise rotations per second. In one embodiment of the invention, by any means disclosed herein, or known to the art, the Software recognizes the meaning of these hand gestures and uses this meaning to program an operable meaning for "360° Rotation" which will be referred to as: "2-360°."

Figure 7:
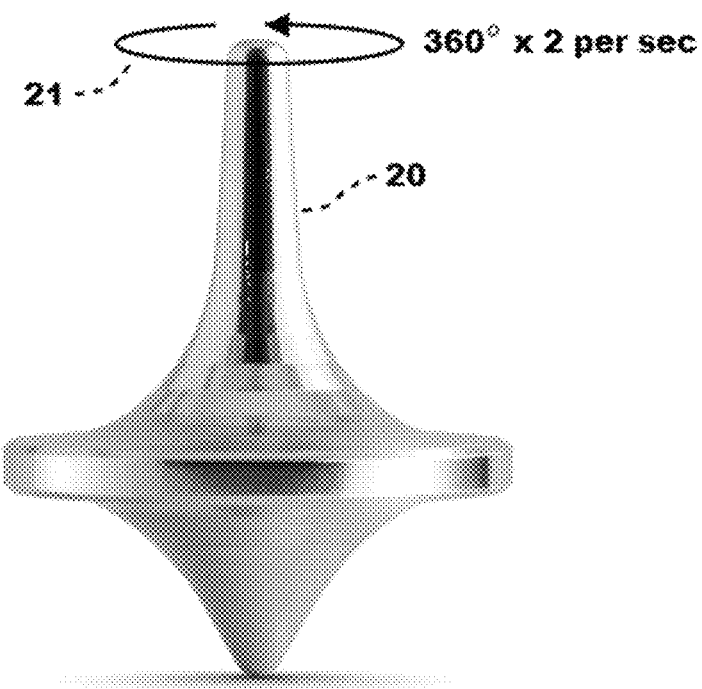
FIG. 7 illustrates the application of an operable meaning to program a stationary spinnable top element.

FIG. 7 illustrates the application of operable meaning "2-360°" (21) to program the characteristics and relationships defining the meaning of top 20.

It's important to note, certain aspects of the meaning of top 20, have relevance to the operable meaning, "2-360°" being used to program it. These relevant meanings include the aerodynamics of top 20, as affected by its shape and metallic composition. Other meanings of top 20, relevant to the programming of top 20, by "2-360°," include an inertia meaning associated with top 20's, "State 1" which defines a stationary, vertical position. The collective of these and other relevant meanings is referred to hereinafter as ("relevant meanings")

In one embodiment, said relevant meanings of top 20, (the target of "2-360°") are utilized by the Software to modify the result of operable meaning "2-360°" as it is used to program top 20, or as a background process.

Since the operations of the Software are user-centric, there are a near infinite number of possible conditions to the programming of "360° Rotation" by the operable meaning "2-360°." In one approach, top 20, is instantly made to spin at a rate and direction, 21, equal to operable meaning "2-360°."

In another approach, this programming is enacted by the Software according to a previously programmed History of Change Tool. In still another approach, this programming is carried out according to an instruction, e.g.: "Make any target programmed by an input, respond instantly to its programming," or any equivalent.

Figure 8:
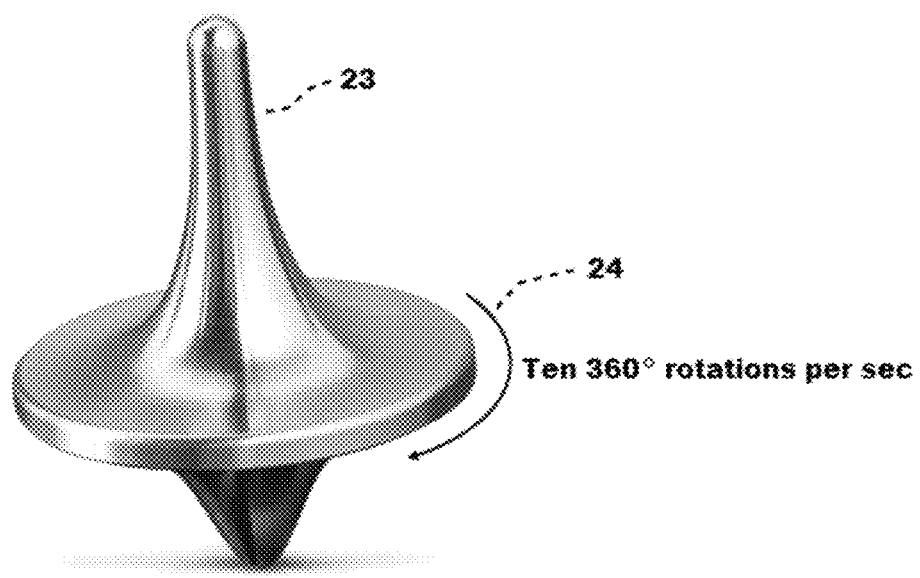
FIG. 8 presents a non-stationary condition of a spinnable top element.

In yet another approach, a stationary top 20, is gradually made to spin counter-clockwise ("CCW") until its spinning rotation equals two, 360° counter-clockwise rotations per second, as defined by operable meaning "2-360°." This rate of change could be the result of a History of Change Tool, or according to an instruction, e.g.: "Make any target programmed by an input, gradually respond to its programming, according to a logarithmic time curve, occurring over a period of 'n' seconds." FIG. 8 presents a non-stationary condition of top 20 (23). Its rate of change, 24, is ten 360° clockwise ("CW") rotations each second.

Figure 9:
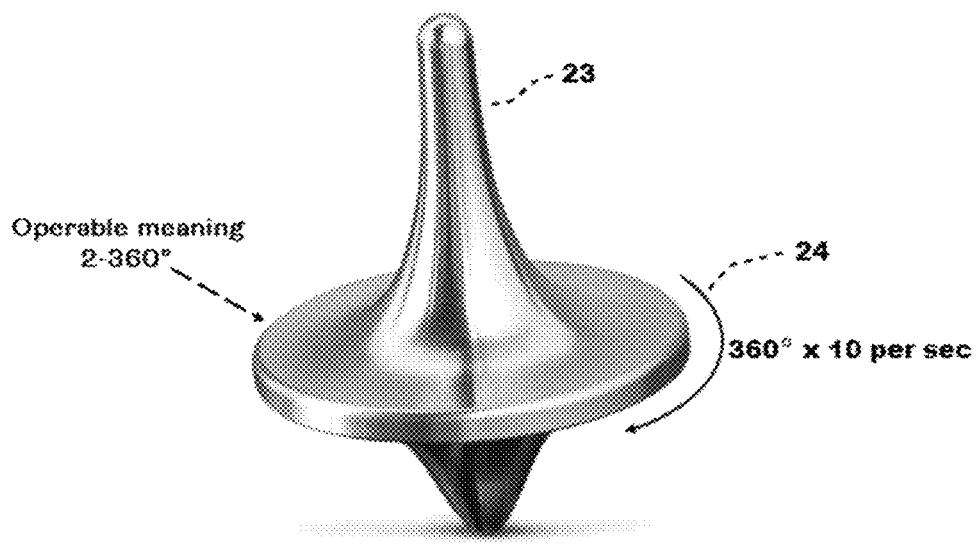
FIG. 9 depicts an operable meaning being used to program the meaning of a non-stationary element.

In FIG. 9, the operable meaning "2-360°" is used to program the meaning of top 23. Many meanings of top 23, have a relevance to the operable meaning "2-360°." These relevant meanings modify the result(s) of the programming of top 23, by operable meaning "2-360."

For the purpose of illustration only, let's consider two of these relevant meanings: top 23's rate and direction of rotation. Top 23, is spinning at a rate of ten CW 360° rotations per second, whereas the rate of rotation of operable meaning "2-360" is two 360° CCW rotations per second.

In one embodiment, the means by which these relevant meanings of top 23, modify "2-360°," are dependent on the context of use of top 23's programming by "2-360°." In one approach, this context of use determines the condition(s) which govern the means by which a CW meaning programs a CCW meaning.

This context could be defined by any number of simple to very complex sets of characteristics and relationships, which may comprise one or more interconnected meanings. Let's consider one relationship context. Let's say this context is determined by a History of Change Tool, previously defined by a user's operation of a rotating element being programmed by an operable meaning with an opposite rotation direction, for example, a CW rotation being used to program a CCW rotation or vice versa.

In one embodiment, a History of Change Tool can be used to enact any meaning which can be carried out by the Software or any associated processing. In the example of FIG. 9, said meaning could be any set of relationships that govern the rate of change from one directional rotation to another. The following is a statement of such a set of relationships as a concept:

"When the operable meaning '2-360°' is consistently applied to program spinning top 23, the clockwise rotation of top 23, will eventually slow to a stop and then become a counter-clockwise rotation, matching the speed, and dimensional motion shape of the operable meaning '2-360°' being used to program it."

A Relationship-Based Programming Tool in Relation to a History of Change and a History of Change Tool In one embodiment, a History of Change is a means for a Software user to access any characteristic, relationship or meaning of any Software content and operate this data as a programming tool at any point in time. In one approach, a History of Change chronicles all change to data defining a content, (said data including any one or more visual, functional and conceptual data, and the characteristics, relationships and meaning conveyed by this data), such that this data can be navigated, interrogated, modified, acquired or utilized as content or as a programming tool.

In a key embodiment, a History of Change Tool is a means for the Software to automatically return one or more results previously produced by at least one prior operation of the Software, and/or at least one prior operation of a content. In one approach, History of Change Tools ("HCTs"), whereby a user can create their own operational logics by how they operate the Software, are user-defined means and methods by which an input to the Software programs certain operations and results. Then at a point in time, when said input performs said operations, they act as triggers to cause the results of a prior input's operations to be carried out by the Software, and/or via any means directed by or otherwise associated with the Software.

History of Change. In a key embodiment, a History of Change is comprised of characteristics, relationships and meaning that define a first state of a content, "State 1", plus any subsequent changes made to this state, which include the results of operations performed as part of the completion of a task or purpose.

Change Data. Any change, at any point in time, to any characteristic, relationship or meaning is referred to as "change data." This includes the modification of any state, condition, operation, function, motion, logic, action, procedure, organization and any other data that exists as a knowable, actionable and/or operable existence within the Software system.

A History of Change includes, in part, any one or more of the following:

- The characteristics, relationships and meaning (also referred to herein as "Software data", or in certain contexts, just "data"), programmed by the Software (as directed by user input or as the result of the Software's own assumptions), which may be used by the Software to carry out any process of which the Software is capable, and/or to define any organization of programmable elements (also referred to herein as "EM elements").
- This Software data may present: (a) a visible image, (e.g., a free drawn line, recognized shape, graphic, picture, video, animation, website, or the like), (b) an invisible element (e.g., an action, logic, function, operation, thought, procedure. or the like), and (c) conceptual data (e.g., concepts, ideas, associations, organizations, contexts, conditions, emotions and the like). Of any of "a", "b" or "c", or a collective of "a", "b," or "a", "b" and "c" can be used to define one or more meanings.
- Any change to the data defining any EM element including any change caused by an input, context, condition, pre-programmed operation, function, action, relationship, timed event or any other operable or actionable existence or occurrence.
- Data defining one or more tools associated with an EM element. This includes the state of the said one or more tools.
- Any EM element to which said tools have been applied or assigned.
- Any context that can affect said EM element.
- Any assignment to said EM element.
- Any input to said EM element.
- Any result of any change to any element managed by said EM element.

Change data as recorded by the Software or any function of Software, at a point in time and for any duration, includes but is not limited to: (a) original states, (b) change to the states of any environment, EM element, meaning or the equivalent, (c) change to the states of the characteristics defining any EM element that enable said any EM element to present image data, functional data, conceptual or other data at a point in time, (d) change to the relationship(s) between one or more EM elements, (e) change to the relationship(s) between one or more organizations of programmable elements, (f) change to the relationships between the characteristics defining any conceptual data, e.g., a context, condition, assignment, logic, function, inclination, purpose, identity, and (g) points in time, e.g., the point in time when a change starts, the point in time when said change ends, the total length of time that elapses during each change, the point in time when the Software commences a record process, the point in time when the Software recording is concluded.

History of Change Tools. In a key embodiment, Software users can program their own tools by how they operate the Software. In one approach, these tools are user-named, saved and recalled via instructions to the Software. In a second approach, a user's operations of the Software and the results of these operations are saved as a History of Change Tool, which is automatically activated by the user operations that created it. The term History of Change refers to changes to the states of characteristics, relationships and meaning at different points in time. These changes can be caused, in part, by: (a) user input, (b) context, (c) an event or condition (d) communication from an organization of programmable elements, (f) communication from an external source, e.g., a cloud-based service, and (g) communication of the Software to itself.

In one embodiment, the term History of Change Tool ("HCT") refers to characteristics, relationships and meaning which are automatically applied to direct the results of user operations according to a context-of use. A History of Change Tool includes user-defined means and methods by which a user's inputs to the Software program certain operations and results. Then in the future when said user performs said operations, they act as triggers to cause the results of the user's original operations.

In this embodiment, a user performs certain operations in a Software environment. Most commonly, these operations are applied to a Software content. As the user performs operations of their own choosing and directed by their own thinking, these operations are analyzed by the Software. A primary purpose of this analysis is to determine what task or sub-task has been or is being performed by the user's operations.

In one approach, a critical part of this analysis is the assessment of the meaning a user's operation and its result(s), expressed in one of two ways: (a) according to a specific context-of-use, e.g., the exact distance a line is drawn from an entered text shape, or (b) quantifying a user's operation as a concept, e.g., drawing a vertical line at any distance from an entered text shape to program a right text margin.

The latter approach provides a greater utility to a History of Change Tool, but it requires a greater understand of the meaning of that utility by the Software. A correct understanding of the meaning of a user's operation includes understanding the meaning of its logical use, as well as its specific use, and when to choose one over the other. For example, what is the logical use of a right-left text margin? Is it permanently fixed in an exact location for all documents? "No," it is not. The logical use of a text margin, among other things, includes its ability to be operated in any horizontal position. Armed with this knowledge, the Software understands when a user programs a right text margin by drawing a vertical line a certain distance from a first placed text shape, this user action programs the concept of "drawing a margin line", not the specific use of a singular drawn input at a precise location.

In a key embodiment of the Software, a user operation, and the result(s) of this operation, which collectively define all or part of a task (e.g., "Task A"), cause the creation of a History of Change Tool. In one embodiment, this tool is saved by the Software and associated with both "Task A"

and the ID of the user who performed said task. Then, at a point in time, performing an operation that is in whole or a part of an "HCT" acts as a trigger, which activates the result of said operation at said point in time. With History of Change Tools each user can create their own operational logics by how they operate the Software. By this means, a user's operations of the Software define their own work tools Below is an example of the user-programming of a context-based History of Change Tool.

A user, Ayren, operates the Software to create text by the following means. He creates a touchpoint by touching a location in his Software environment. He selects a font shape, e.g., Times New Roman, by saying: "Times New Roman, 11." And he enters a first text shape via a typed input. Ayren's operations and their results define a context-of use. In one approach, these operations, their results, and the context-of use they define are saved as a History of Change Tool linked to Ayren's personal ID.

So, Ayren enters a word, "The," whose first letter shape appears at his touchpoint. Then Ayren says: "Margin" and draws a vertical line 10 centimeters to the right of his first text character (the "T" in the word "The"), as shown in FIG. 50. The logical use of a drawn vertical line to set a right margin (measured from the left margin defined by the "T" character entered at Ayren's touch point) is saved to Ayren's History of Change Tool.

Ayren continues entering text, which automatically wraps when it hits his drawn vertical line. Ayren's use of this function causes it to be saved to his History of Change Tool. Ayren's first text wrap is shown in FIG. 51.

Ayren hits the Enter key on his keyboard to create a second paragraph, as shown in FIG. 52. Ayren's use of the Enter Key is added to his History of Change Tool.

After Ayren types his second paragraph, he touches just above its first line of text shapes and says: "Ripple," (a term previously defined by Ayren) and drags downward to increase the spacing between the two paragraphs. Ayren's "Ripple" function, and his programmed vertical space (a specific use) are added to his text History of Change Tool, as shown in FIG. 53. By these operations, Ayren reprograms the default vertical spacing between paragraphs when using the Enter Key.

In a key embodiment, Software users can program their own terms. Accordingly, the term "Ripple" was defined by Ayren with the following instruction: "When I say 'Ripple' followed by a touch and a downward drag, all elements below my touch are moved down by the same distance as my drag. The same applies in reverse when I touch and drag upward."]

Now, let's say Ayren wants to program an alternate to the vertical spacing between the paragraphs he just programmed, and have the alternate triggered by a different context-of use—not the Enter Key.

He programs a new context-of-use, by saying: "When I touch my thumb and middle finger together like this" [he taps his thumb and middle finger together twice within one second] create a new paragraph and change the vertical spacing to this." [He touches and drags downward to program a larger vertical space between two paragraphs.] This new spacing and its relationship to his hand gesture are saved to Ayren's text HCT.

Activating a History of Change Tool

In one approach, an HCT is automatically activated by performing any operation that exists as part of an HCT. So, whenever Ayren performs an operation that is saved to his text HCT, that operation triggers the HCT to automatically present the results of that operation as it was saved to his HCT.

In summary, Ayren's above operations have programmed a History of Change Tool. His inputs have been saved as a composite of tasks and contexts-of-use, defining the creation of a document layout with the following characteristics:

A. A first typed character is placed by the Software on Ayren's touchpoint, defining a left margin.

B. Ayren's default set of Software shapes and associated attributes is Times New Roman, 11 point.

C. A drawn vertical line in any horizontal position sets a right margin.

D. Paragraphs have no indented first line of text.

E. The Enter key is used to create a new paragraph.

F. When the Enter Key is used, the vertical spacing between paragraphs is the standard paragraph spacing of Times New Roman, 11 point.

G. A double tapped thumb and middle finger serves as both an alternate way to create a new paragraph, and causes an increased vertical space to be used between paragraphs.

H. When Ayren touches and drags downward or upward, all elements lying within the path of his drag are moved the same distance as the drag.

The idea of History of Change Tools is two-fold: (1) they are programmed by a user's operation of the Software and its content, and (2) as a user performs operations that have been saved to an HCT, the results of these operations are presented by the HCT. It should be noted that the History of Change Tool created by Ayren in the above example is a Software content, which can be shared (or sold) via a MarketPlace, via a collaboration session, or sent directly between Software environments.

The details illustrated in the above example are, of course, arbitrary, and other users will undoubtedly have their own ways of creating History of Change Tools.

Figure 10:
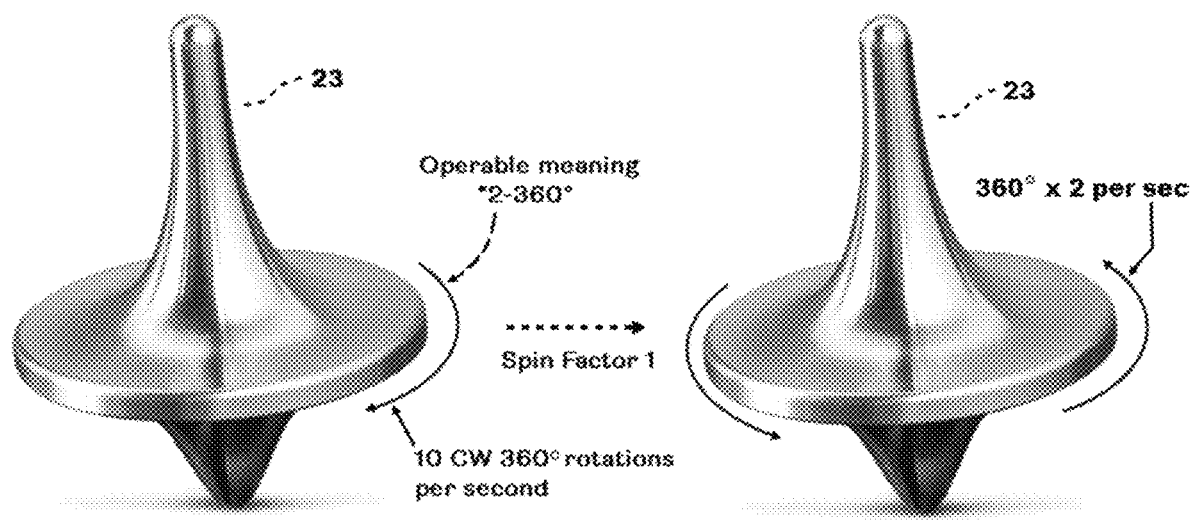
FIG. 10 illustrates a causal relationship programmed by conditional relationships.

In FIG. 10, the speed of the clockwise spinning of top 23, is gradually slowed as the operable meaning "2-360°" is applied to program it. This causal relationship is programmed by the following conditional relationships in the form of a user instruction, as it applies to the application of the operable meaning "2-360°" to top 23.

Here is the instruction: "Apply the meaning of "2-360°" to top 23, according to the following events (referred to herein as "Spin Factor 1":

(a) Alter the CW rotation of top 23, according to a linear time curve, for a duration of 4 seconds, to reach a stationary, vertical position for top 23.

(b) Maintain this stationary, vertical position of top 23, for 5 ms.

(c) According to a root cosine time curve, over a duration of 1.5 seconds, alter the rate of the rotation of top 23, to two CCW 360° rotations per second.

In another approach, the programming of top 23, could be according to a meaning governed by known laws of motion dynamics. In this case, the conditions governing the reciprocal programming of operable meaning "2-360°" by the relevant meaning of top 23, are the known motion dynamics of an element matching the defining characteristics, relationships and/or meaning of top 23. These known motion dynamics are utilized to modify the rate at which top 23 is transformed from a stationary position to a CW rotation equaling two 360° rotations per second.

In this example, the known motion dynamics of spinning top 23, govern the rate at which the reciprocal programming of the target (top 23) modifies the "2-360°" operable meaning being used to program it.

In one approach, the operable meaning "2-360°" is applied to top 23. Because of the CW rotational inertia of top 23, the application of "2-360°" in this manner only slows down the rate of top 23's spinning, but does not change its CW rotation to a CCW rotation.

In order to overcome top 23's CW rotational inertia, a new operation of the conceptual meaning "360° Rotation" is performed to create a different operable meaning for "360° Rotation." Let's say a user performs a CCW 360° hand gesture four times a second, which defines a new operable meaning ("4×360°") for "360° rotation."

A user applies this new operable meaning "4×360°" to top 23, and continues repeating it over and over until the CW rotational inertia of top 23, is overcome, and top 23, is spinning CCW four times a second.

How is operable meaning "4×360°" applied to top 23? In one approach, the user applying "4×360°" has previously established a History of Change Tool that states: "Any gestural impingement of a Software content programs that content in real time."

In keeping with this programming, this user performs "4×360°" in a near proximity to the spinning top 23. The user continues their real time gesturing until top 23, changes its rotational direction and matches the speed of the circular gesturing of the user.

In another approach, the operable meaning "4×360°" is applied to the spinning top 23, via a verbal instruction. For example: "Program top 23, with "4×360°" until top 23 matches the speed and direction of "4×360°."

Referring now to FIG. 11, a user presents the following instruction to the Software: "Give me the melting of ice on a hot surface" (26). Instruction 26, is purposed to create a concept content without referencing an existing content. In one approach, this is created with an instruction that relies on the Software's knowledge. The melting of ice on a hot surface without the ice or the surface is a concept. In a key embodiment, the Software's understanding of this action enables it to create this concept content.

Where does this understanding come from? It comes from any source of information accessible to the Software or any system, component or service of, or that is associated with the Software. This includes existing data bases, e.g., the Library of Congress, encyclopedias, professional journals, periodicals, education media, blogs, commentary, data analyses, universities, museums, entertainment media, news media and a host of other information sources which can be accessed by the Software and processed.

What is this concept content? In one approach ("A-1"), it's the meaning of a relationship between an action and a causality. In the example of FIG. 11, it's the meaning of the physical transformation of a water solid into a liquid, caused by a rise in temperature applied to a facet of the water solid, which affects its temperature through direct contact, and then through convection. This meaning is distinctly different from, let's say, a rise in air temperature surrounding a water solid, which would tend to affect all surface areas of the solid at once, and then transfer its effect through convection.

With the understanding of "A-1's" conditions and causalities, the Software returns a concept content to the user. In a key embodiment, this concept has no inherent visible component. But it has defined meaning, which can be understood, utilized and acted upon. According to its understanding, this concept can be used to program other content, including other concept content and content which has a visual component.

In FIG. 11, a user names this meaning content, "Melting 1" (27). At any point in time, a user can apply this meaning content to another content via any means disclosed herein or known to the art. These means include, but are not limited to: (a) the presentation of an instruction to the Software or an associated system, (b) the operation of a visual element which has been designated as an equivalent for "Melting 1", (c) an event, (d) a condition, or (e) designating Melting 1, 27, as a relationship-based programming tool via an operation of Melting 1.

It is important to note, when Melting 1, 27, used as a relationship-based programming tool, the programming result of Melting 1 is subject to the reciprocal programming of the relevant meaning of its target. Referring to FIG. 12, a user selects an environment media of an outstretched hand "My Hand" 28, and programs a context-of-use for Melting 1, 27, with the following instruction: "Make 'Melting 1' cause anything I put here to melt", 30. The user touches the center 29, of My Hand 28, to define the term "here" in instruction 30.

Referring now to FIG. 13, a user places a content, a chunk of silver metal "Silver" 31, into My Hand 28. This establishes a reciprocal programming relationship between three content as defined by instruction 30: (a) Melting 1, 27, (b) Silver, 31, (referenced by the term "anything"), and (c) My Hand 28, (referenced by the term "here").

Of note, regarding the relevant meaning of a target, there are many different factors that can determine this relevant meaning. Here are two: (a) the inherent meanings of the target, and (b) programmed meanings applied to the target via any programming methodology. The operations of the Software can be defined by real world laws of physics or according to fantasy scenarios. In one embodiment, the Software applies known laws of physics to operations of Software elements unless otherwise instructed.

According to natural laws of physics, the temperature of a human hand, approximately 98.6 F, cannot melt a silver ingot, which has a melting temperature of 1,763° F. In one approach, in order to achieve the result of the programming of Melting 1 as presented in FIG. 13, a circumstance is programmed for the target. This could be accomplished via many means disclosed herein, for example, via instruction 34: "Apply the following meaning to My Hand: any substance contacting My Hand is made to melt regardless of its melting temperature." As a result of this programming, Silver 31, will begin to melt upon contact with the surface of My Hand. 28.

In FIG. 13, Melting 1, 27, acts as a relationship-based programming tool whose operable meaning is modified by the user's placement of Melting 1's target, Silver 31, into My Hand 28. The user's operation of Silver 31, to impinge My Hand 28, determines the position and angle of Silver in My Hand. This spatial relationship determines: (a) the part, 32, of Silver 31, that melts first, and (b) the directional flow 33, of Silver's melted metal.

These relevant meanings modify the result of the operable meaning of Melting 1, which includes its programed properties as per instruction 34.

How does the Software enact the programming of Melting 1 and the reciprocal programming of its target? In one approach, the Software conducts three operations: (a) it analyzes the primary relationships of Silver and My Hand to the meaning Melting 1, (b) it derives relevant meanings from each of these relationships, (c) it connects these meanings into one interrelated, and in this case, interspatial composite meaning, and (d) it uses this composite meaning to program the result of the programming of the target, Silver 31, by the meaning of Melting 1, 27.

Operating a Relationship-Based Programming Tool Via an Assignment.

The methods of programming relationship-based programming tools are as varied as the inputs used to program them.

Figure 14:
FIG. 14 depicts the raw visual meaning of a content.

FIG. 14, shows a Software content "Sharp Cliff" 36A, which exists as a raw visual meaning. A user designates Sharp Cliff as a relationship-based programming tool, via an instruction, 37A: "Designate 'Sharp Cliff' as a relationship-based programming tool." Of note, this is one of many ways to designate a content as a relationship-based programming tool. In another embodiment, any input (e.g., from a user or any valid input source), operates a first content to program a second content as its target. At or about the time of the operation of said first content to program said second content, an operable meaning is created for said first content, according to its operation. Based on its context of use, the programming of said second content by said operable meaning, defines the operation of a relationship-based programming tool. As a part of this operation, the Software determines if said second content is a valid target for said operable meaning. If, "yes", the target is programmed according any means disclosed herein, or known to the art.

The Software analyzes said second content for any meaning which has relevance to the operable meaning being used to program it. If such meaning is found, it is utilized to modify the result of the programming of said second content with said first content's operable meaning.

In light of this, it should be noted that the use of instruction 37A, is optional. In FIG. 14, the content Sharp Cliff, 36A, could have been designated as a relationship-based programming tool, according to its operation to program another content or to program itself.

Figure 15:
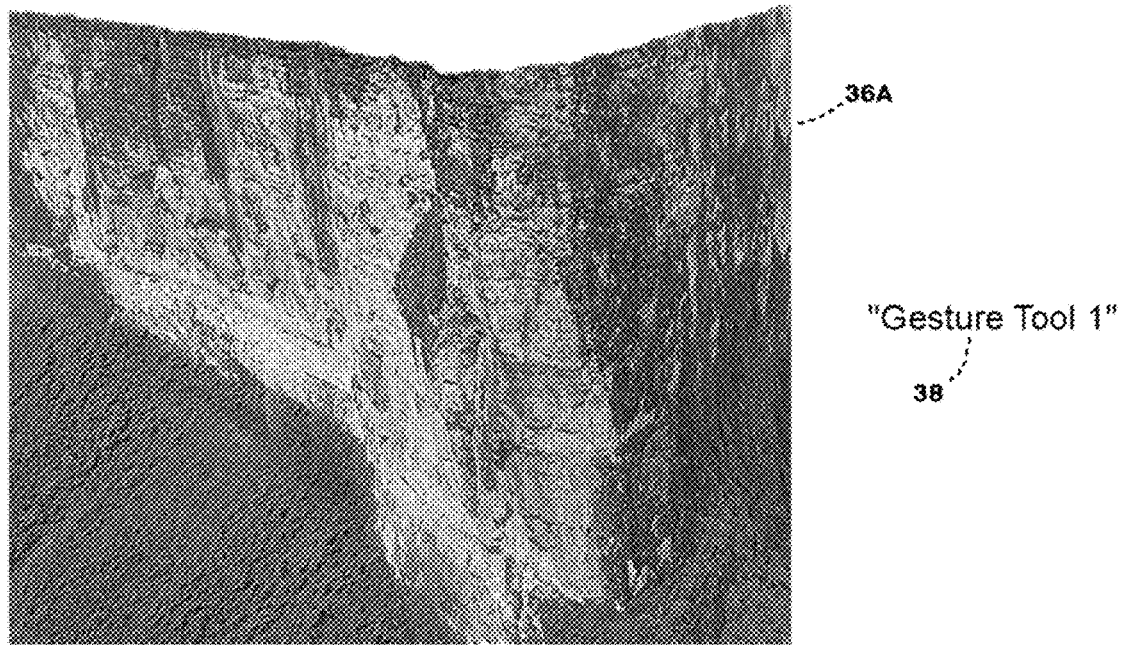
FIG. 15 depicts the programming of an equivalent for a meaning.

In FIG. 15, a user programs the name, "Gesture Tool 1", as an equivalent for Sharp Cliff, 36A, via the instruction, 37B, "Make 'Gesture Tool 1' an equivalent for Sharp Cliff." As a result of this programming, any operation of Gesture Tool 1 can be used to modify one or more aspects of the meaning of Sharp Cliff.

In addition, as an example only, the user presents the following additional instructions to program the operation of Gesture Tool 1, 38.

"The width of the content represented by Gesture Tool 1 is defined by the travel distance of the input used to operate Gesture Tool 1."

"The touchpoint and path of said input determine the shape of the top edge of the content for which Gesture Tool 1 is an equivalent."

As a result of this second additional instruction, as an inputted gesture is moved along a path, the top edge of the content (Sharp Cliff) represented by Gesture Tool 1 is reshaped to match the shape of said path.

Figure 16:
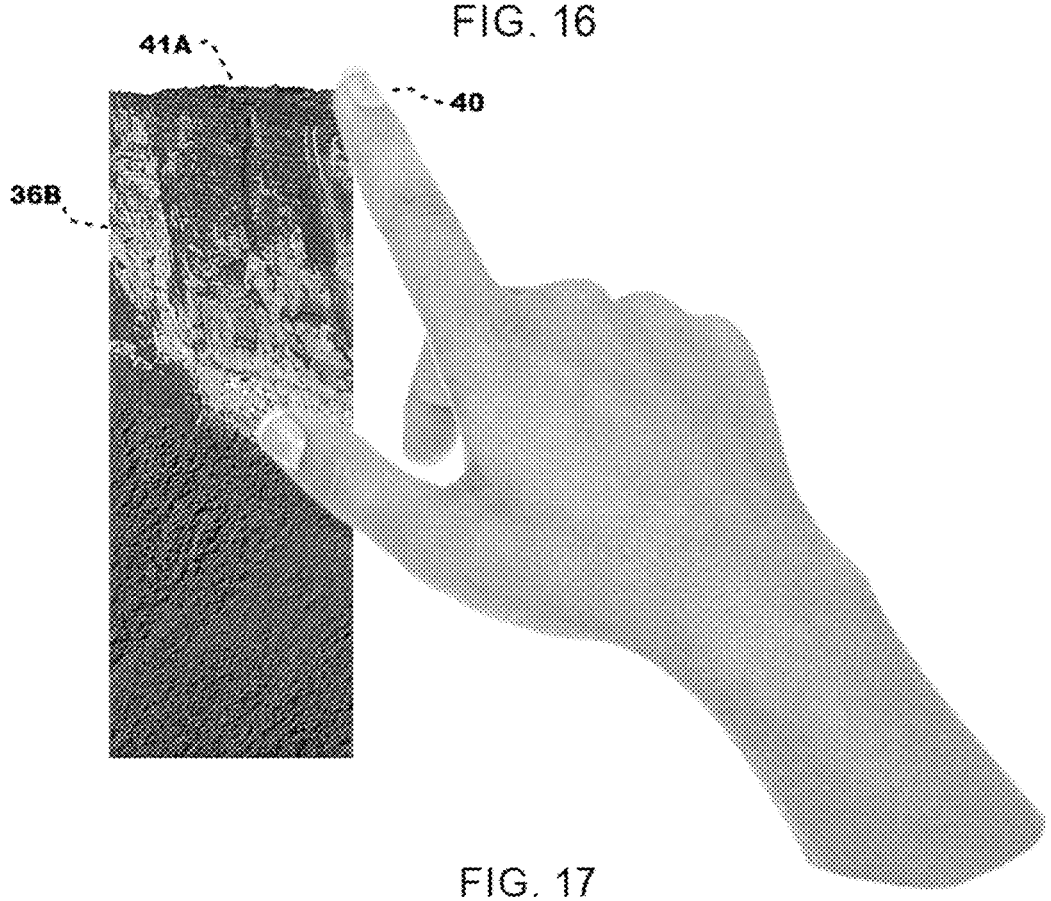
FIG. 16 shows a partial result of the programming of a target with an operable meaning.

Referring now to FIG. 16, via any means disclosed herein or known to the art, the user selects Sharp Cliff (36A, as shown in FIGS. 14 and 15). Gesture Tool 1, 38, (not shown) is applied via a hand gesture 40, to program Sharp Cliff (shown as 36B in FIG. 16). This creates an operable meaning ("OM1") for Sharp Cliff 36A.

With further regards to FIG. 16, as "OM1" is used to program Sharp Cliff 36A, the shape of the path of input (e.g., a hand gesture) 40, reforms the top edge 41A, of Sharp Cliff and reprograms its surface topology to match the change in its surface angle to create Sharp Cliff 36B.

Figure 17:
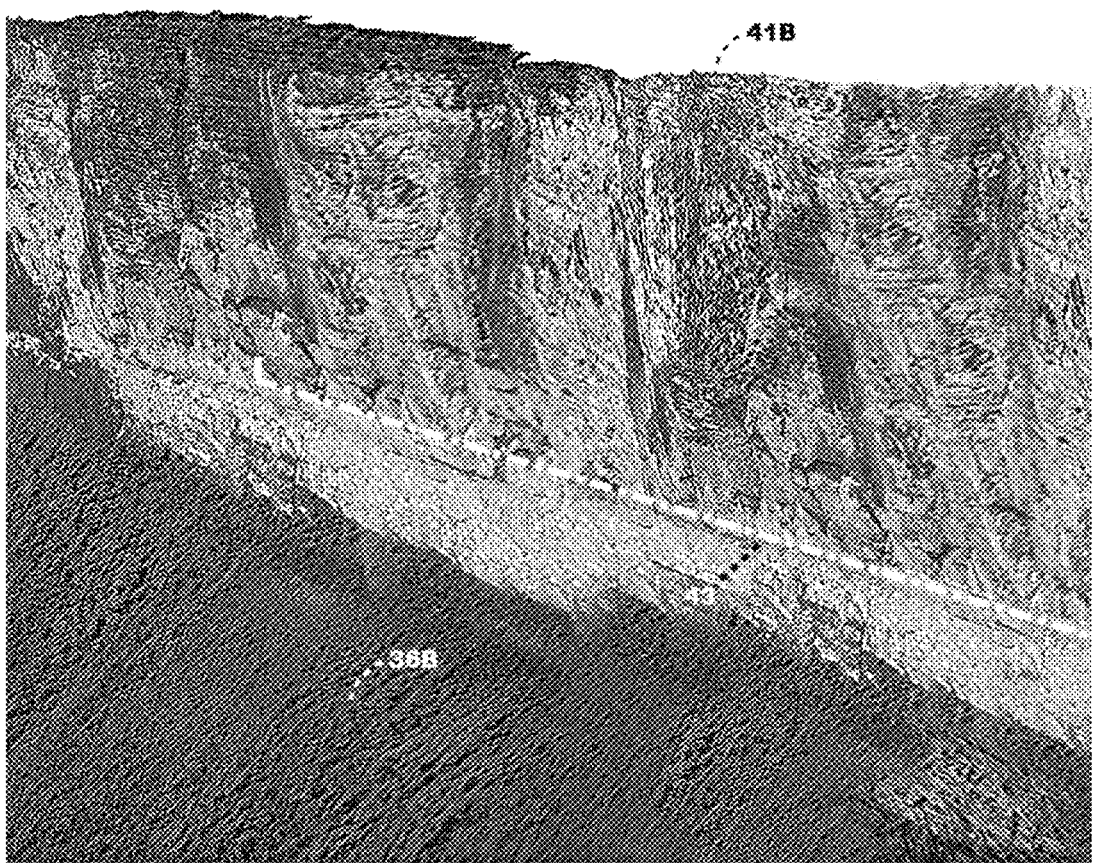
FIG. 17 shows a completed result of the programming of a target with an operable meaning.

FIG. 17 shows the complete reshaped top edge 41B, of Sharp Cliff, 36B, and its reformed front face topology 43, as the result of the completion of the hand gesture or path 40, shown as a work in progress in FIG. 16. There are many possible methods of achieving the topological reprogramming of Sharp Cliff, 36B.

In one approach, the Software pastes the left side of the cliff end-to-end to create a longer co-planar surface. In another approach, the Software takes the textures and tones of the left side of Sharp Cliff 36B, and reorganizes them to create an extension of the cliff as a coplanar linear surface, as shown in FIG. 17.

These types of operations are based on well-known graphic design principles, but they are not the only means to create the result of programming Sharp Cliff 36A, as 36B, with an operable meaning of Gesture Tool 1, 38.

In another approach, the Software goes out to the internet and gathers information about Sharp Cliff 36A. If this information is not already known to the Software, it discovers the topological and other meaning that are relevant to the programming of Sharp Cliff, 36A, with Gesture Tool 1, 38. This relevant meaning is used to program the result of the operable meaning of Gesture Tool 1 as it has been applied to program Sharp Cliff 36B. In one approach, as a part of this analysis, the Software applies a recognition process to determine if Sharp Cliff, 36A, has a known meaning. If this information is not already known to the Software, in one approach, the Software discovers that what has been user-named Sharp Cliff is a very famous plateau in South America, called Mount Roraima. There is a large amount of available data pertaining to the rock strata comprising this plateau.

The Software analyzes the type of rock and topologies comprising the cliff face of this plateau based on information available to the Software from data archives, or that exist as part of the Software's own factual knowledge. As a part of this process, the Software analyzes the raw visual meaning of Sharp Cliff, 36A, including its existing texture, with an "eye" focused on this task: presenting the Sharp Cliff face as a coplanar linear surface (shown as 36B in FIG. 17) that is a logical extension of the left side of Sharp Cliff, 36A.

In one approach, the Software tasks itself to modify the existing topological structure of Sharp Cliff 36A, by building original data. In this approach, the Software utilizes the data it has acquired through its own analysis to create a convincing extension of the cliff's linear surface. This is done by creating shapes, textures and tones that blend naturally with the left side of the cliff, but are not a duplicate of its properties. In one approach, this process is carried out by performing comparative analyses of newly created cliff topologies with existing Sharp Cliff, 36A, left side topologies. The newly created topologies that are within an acceptable match (whose value can be set by a user, according to a History of Change Tool, a context of use, or other causal event) of the existing Sharp Cliff, 36A, left side topologies, are utilized to build an extended coplanar right side of Sharp Cliff 36A, as Sharp Cliff 36B.

In another approach, the Software creates a comprehensive visual meaning of the Mount Roraima cliff face as presented by Sharp Cliff 36A. This meaning is used to define the real time programming of the operation of Gesture Tool 1, 38, to program Sharp Cliff, 36A, to become Sharp Cliff 36B.

In Summary.

Via an instruction, the meaning of content, Sharp Cliff, 36A, is designated as a relationship-based programming tool and assigned to an equivalent, Gesture Tool 1, 38.

(a) The equivalent, Gesture Tool 1 is operated by a user's gestural input 40, which creates a new operable meaning, "OM1", for the content Sharp Cliff, 36A.

(b) Said operable meaning "OM1" is used to program the meaning of the content, Sharp Cliff, 36A, whose meaning said operable meaning modifies.

(c) The method of the application of said operable meaning is, in part, the meaning of its operation. In this regard, the distance and shape of the operation of Gesture Tool 1 program the width and top edge shape of Sharp Cliff 36A, to become Sharp Cliff 36B.

(d) The meaning of Sharp Cliff 36A, relevant to its programming by operable meaning "OM1", programs the result of said operable meaning's programming of its target, Sharp Cliff 36B. In this case, an operable meaning of a content is being used to program itself.

(e) The operation of Gesture Tool 1 defines a generally coplanar surface for Sharp Cliff, 36A, (shown as 36B in FIG. 17) whose relevant meaning (which is either known by the Software, acquired by the Software, or is partially known by the Software and partially acquired by the Software) is used to program the result of said operable meaning's programming of its target, Sharp Cliff, 36A, to produce the result shown as 36B in FIG. 17.

Figure 18A:
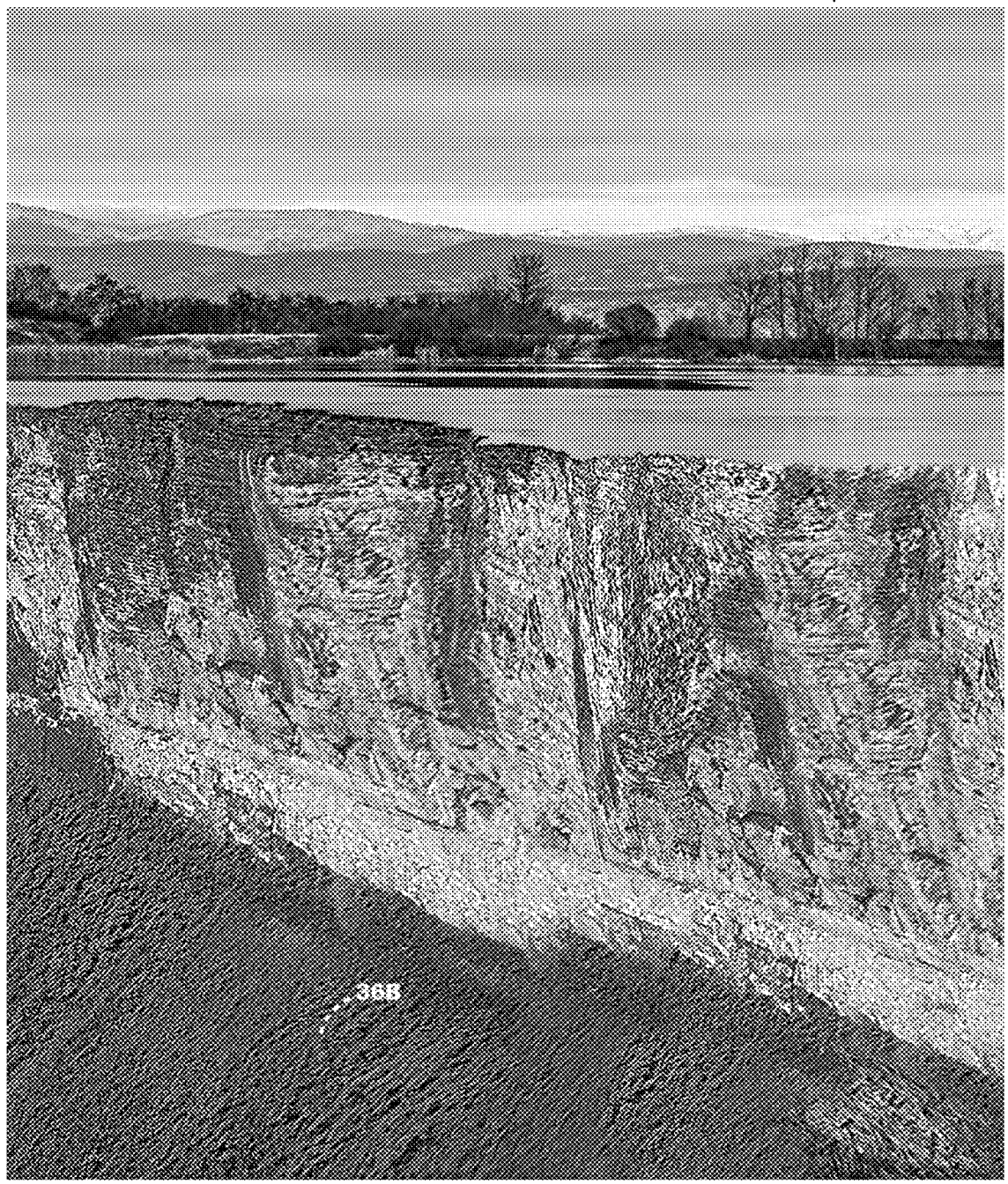
FIG. 18A depicts an operable meaning being used to program another content.

In FIG. 18A, the operable meaning "OM1" has been used to program a new target, an environment media "Lake Scene" 44A. In this example, the meaning of the target, "Lake Scene" 44A, relevant to operable meaning "OM1's" programming of "Lake Scene", is the meaning of the water of the lake, which programs the blending of the top edge of Sharp Cliff to the lower edge of the lake in "Lake Scene" 44A.

Figure 18B:
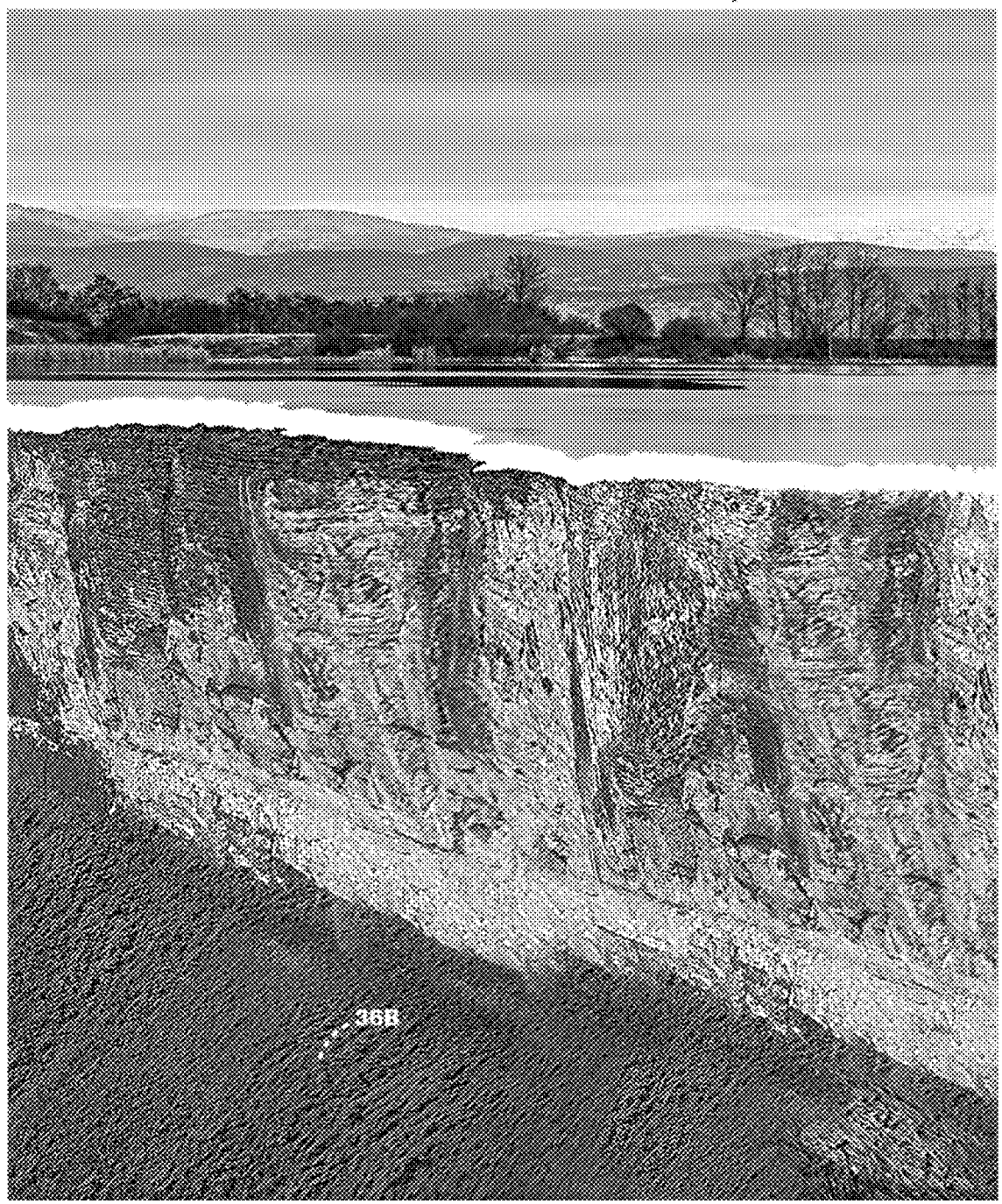
FIG. 18B illustrates a key aspect of a programming of a content with an operable meaning.

FIG. 18B illustrates a key aspect of the programming of "Lake Scene" with the operable meaning "OM1." The programming of visual, functional and conceptual data is accomplished by the Software without graphical layers. In accordance with this approach, the operable meaning "OM1" inputted to "Lake Scene" 44A, (as shown in FIG. 18A) reprograms the impinged meaning of "Lake Scene" with two meanings:

(a) The meaning of the path shape (shown as 40, in FIG. 16, and as a complete edge 41B, in FIG. 17) defined by the operation of "OM1" as applied to "Lake Scene" 44A. This defines the lower edge of "Lake Scene" 44A.

(b) The meaning of Sharp Cliff 36B. By any means disclosed herein, the meaning of Sharp Cliff 36B, reprograms the meaning of "Lake Scene" impinged by Sharp Cliff 36B.

In FIG. 18B, "Lake Scene" 44B, and Sharp Cliff 36B, have been moved apart to show the redefined meaning of "Lake Scene" 44B, by its programming of the meaning of Sharp Cliff 36B. There are no graphical layers here.

Figure 19:
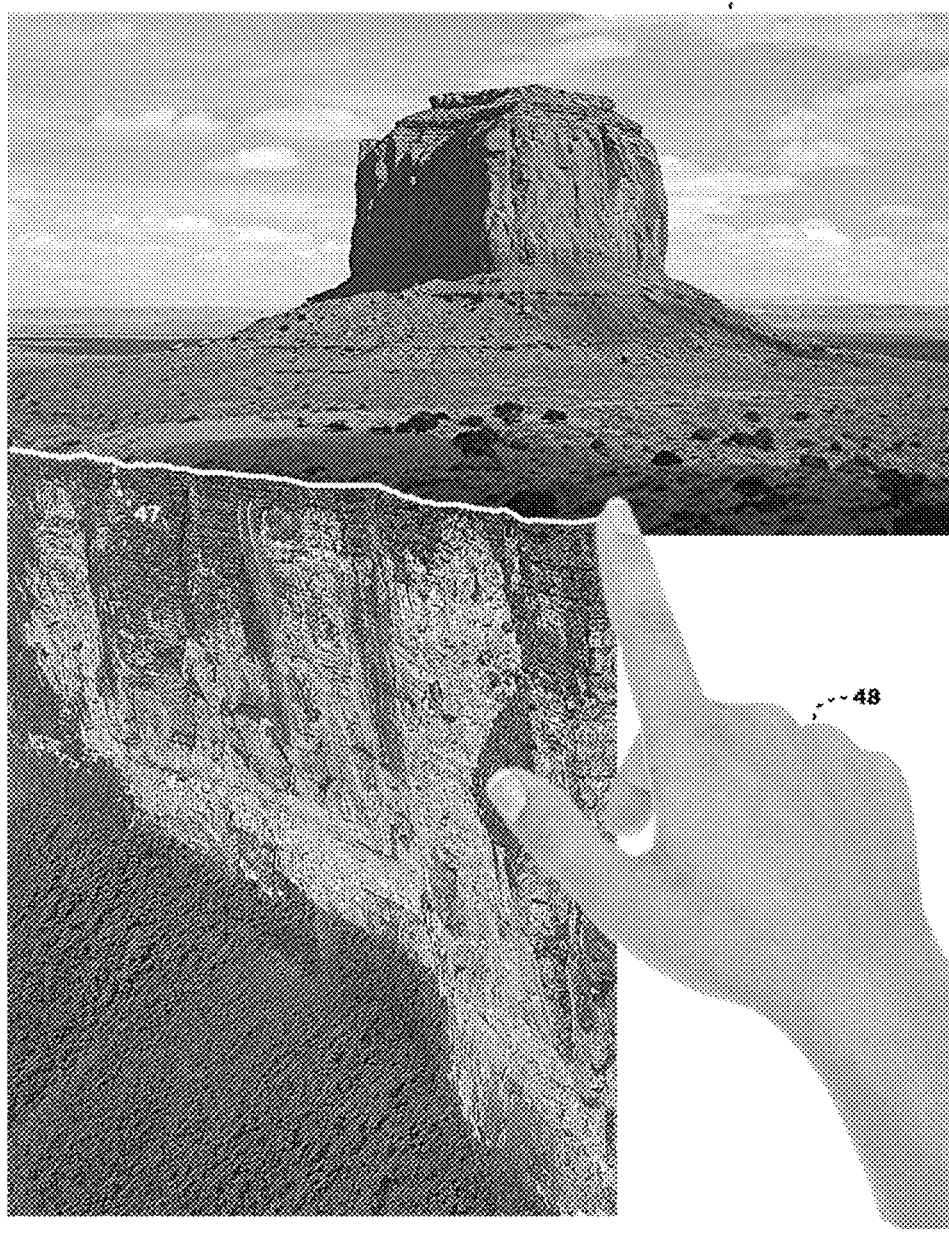
FIG. 19 shows a completed path of an operable meaning and the initial result of its programming of a target.

In FIG. 19, a new operable meaning "OM2" is being used to program a content, "Monument Cube", 46, along a path, 47, defined by a hand movement, 48. For the purposes of this discussion, "Monument Cube" exists as a raw visual meaning.

Figure 20:
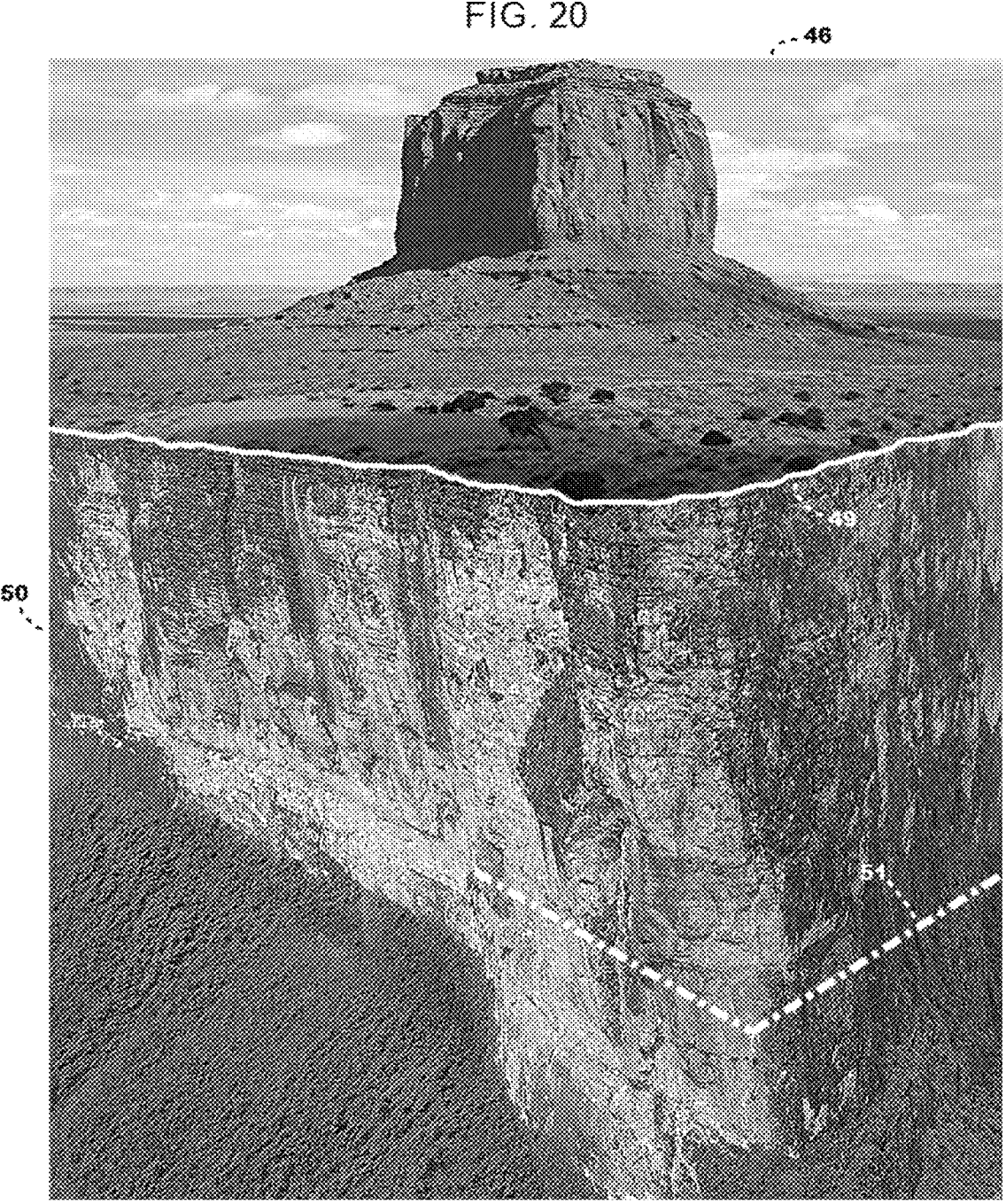
FIG. 20 depicts a key relevant meaning.

FIG. 20 shows the completed path 49, which is the result of the inputting of operable meaning "OM2" to program Monument Cube 46. As a result of the initial programming of Monument Cube with "OM2," Sharp Cliff has a new angular topology 51, and a newly shaped upper edge as defined by path 49.

In one embodiment, as a part of the programming of Monument Cube 46, by "OM2," the Software analyzes the raw visual meaning of Monument Cube to determine any meaning defined by this content which is relevent to its programming by "OM2."

Figure 21:
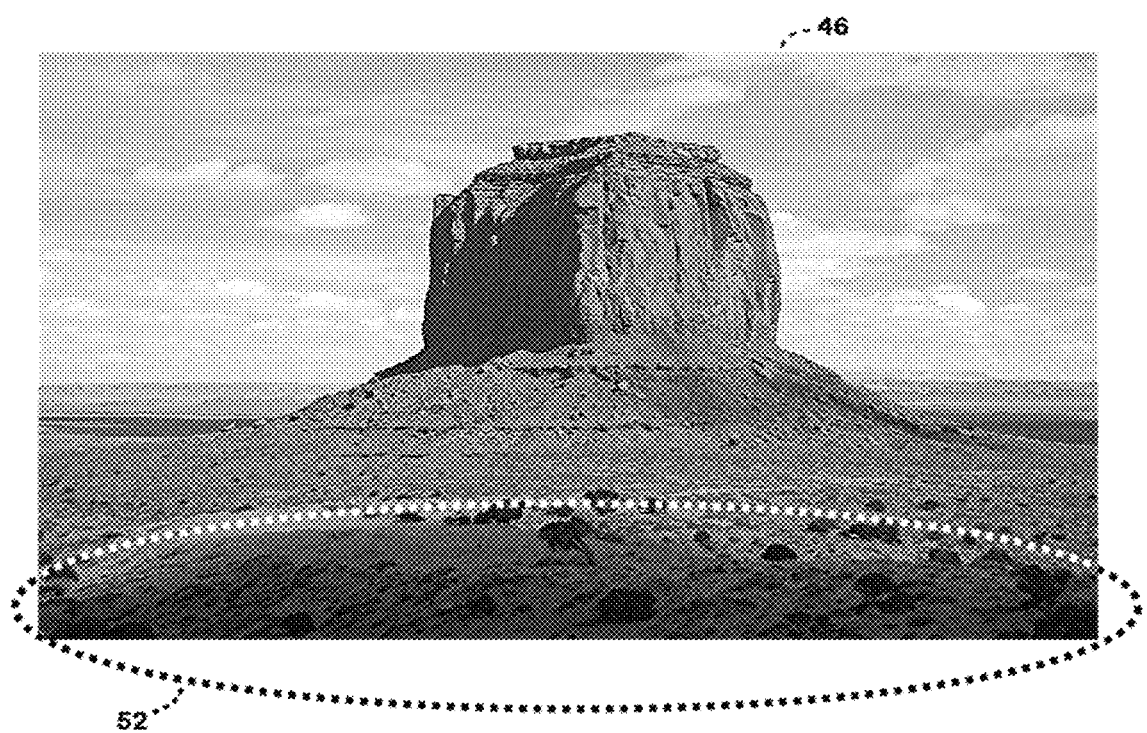
FIG. 21 presents the result of the reciprocal programming of a relevant meaning.

Referring now to FIG. 21, a key relevant meaning of Monument Cube 46, is found, the forground shadow 52, over the lower portion of the Monument Valley scene, Monument Cube. In one approach, upon analysis, the Software determines the cause of this shadow: a group of clouds above this area of the Monument Valley scene presented in Monument Cube 46. The Software determines that this shadow has relevance to the programming of Monument Cube, 46, with "OM2."

As a result of this determination, the Software acquires the characteristics, relationships and meaning necessary to program the result of "OM2's programming of Monument Cube.

In one approach, the Software applies a recognition process, or its equivalent, to analyze the raw visual meaning of Monument Cube. As a result, the foreground shadow in Monument Cube is recognized. As a result of this recognition, the Software acquires the characteristics, relationships and meaning that define this shadow, 52, including its color, density and shape and likely affect on different shaped topologies. Based on the Software's understanding of the meaning of the causes and effects of shadow 52, the Software uses this meaning to apply the result of the overhead clouds causing shadow 52, to the top edge 49, and front face of Sharp Cliff, 50.

Figure 22:
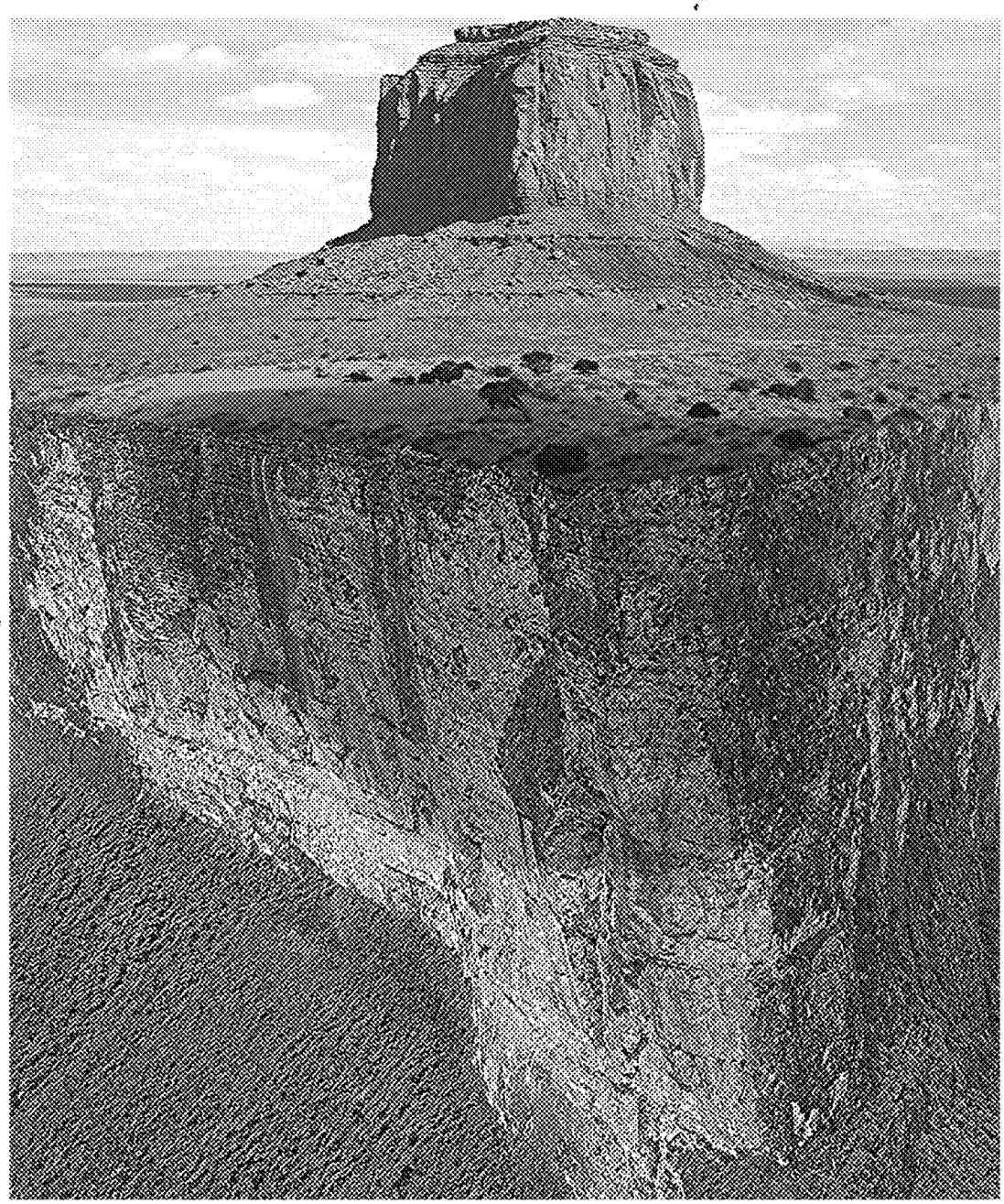
FIG. 22 depicts the result of a reciprocal programming.

FIG. 22 presents the result 53, of the reciprocal programming of the relevant meaning of the foreground shadow 52, in the lower portion of Monument Cube 46, to program "OM2's" result of its programming of Monument Cube. As a result, the meaning of shadow 52, is used to program portions of the upper edge and face of Sharp Cliff, 53. Of note, the programming of the result of "OM2's" programming of Sharp Cliff by the relevant meaning of shadow 52, is based, in part, on the Software's extrapolation of the height and angle of the sun causing the shadow, and upon an estimated range and density of said shadow's affect on the top edge and front face of Sharp Cliff, 53. In one approach, said extrapolation is the result of the Software's understanding of the meaning of shadows caused by clouds cast on a topological shape.

In one embodiment, by any means disclosed herein or known to the art, upon the operation of a Software element ("Element 1"), the Software performs the following, either concurrently, sequentially or in combination.

A. Has an input been used to operate Element 1?

B. If "yes", acquire the characteristics, relationships and/or meaning that define Element 1 just prior to said input to Element 1 ("Defining Data 1"). Save this data to a memory, and/or retain this data as a known meaning.

C. By any suitable means, including via analysis or via known meaning, acquire the characteristics, relationships and/or meaning that define said input to Element 1.

D. Save this data to a memory or retain this data as a known meaning.

E. Acquire the characteristics, relationships and/or meaning that define Element 1 after said operation of Element 1 ("Defining Data 2"). Save this data to a memory, or retain this data as a known meaning.

F. Perform a comparative analysis of Defining Data 1 and Defining Data 2 to determine the change data caused by said input to Element 1.

G. Acquire the relationships (e.g., between the characteristics, relationships and/or meaning) of said input to Element 1's Defining Data 1, and the change data resulting from said input's programming of Defining Data 1.

H. Via any means disclosed herein, or known to the art, analyze said relationships.

I. Do these relationships determine a known task?

J. If "yes", derive a directive from said input's operation of Element 1.

K. Save said directive and the result of the application of said directive to Element 1's Defining Data 1 as an operable meaning, e.g., "OM-1" of Element 1.

L. As an alternate to "K", save the meaning of said input's operation of Element 1 and the meaning of Defining Data 2 as an operable meaning, e.g., "OM-1."

Said operation of Element 1 alters Element 1's meaning at a point in time. The programming of Element 1 via its operation is dependent upon the characteristics, relationships and meaning that define said operation at the point in time of said operation's programming of Element 1. The operable meaning of Element 1 (or any Software content) is reprogrammable according to the meaning of the input which operates it at a point in time.

In one embodiment, the operable meaning, "OM-1," is the meaning of the result of the operation of Element 1, as determined by the meaning of the operation that programs it.

In a key embodiment, the operable meaning of any Software content is the meaning of the content as modified by its operation at a point in time.

In one approach, the Software reasons with the following logic:

Is a Software element active in a Software environment?
Yes
Find said Software element and acquire its "State 1," or if it includes change data, acquire the latest change data meaning of said Software element from its History of Change.
Has this Software element received an input which modifies its "State 1" meaning, or its meaning defined by its latest change data?
Yes.
Acquire the data defining the state of said Software element, just prior to said element receiving said input.
Save and label this acquired data: e.g., "State 1-A," to memory.
Is the state of said element after receiving said input different from "State 1-A" of said element?
Yes.
Acquire the data defining this different state.
Save and label this state: e.g., "State 1-B," to memory.
Perform a comparative analysis of "State 1-A" and "State 1-B." Derive change data from said comparative analysis that distinguishes "State 1-B" from "State 1-A."
Does found change data define a task?"Yes."
[Note: with further regard to the Software query: "Is the state of said element after receiving said input different from state "State 1-A" of said element?," if "no" said input operates the existing meaning of said element without modifying it.]
Save this task definition to a memory or an equivalent.
Optional: name this task definition, e.g., "Task 1."
Recall a task model that closely matches the task of "Task 1."
Compare each change state of "Task 1" to said recalled task model.
Is "Task 1" a sufficient match to said recalled task model?
Yes.
[If "no", recall another task model that closely matches the task of "Task 1." Compare each change state of "Task 1" to said another task model.]
Save the result of the programming of said Software element by Task 1, and the meaning of its operation as an operable meaning.
Name said operable meaning.
Save this operable meaning to a suitable storage media.

M. In one embodiment, to enable the operation of Element 1 to program a target ("Target 1"), the Software performs the following:

Acquire the characteristics, relationships and/or meaning of Element 1, as modified by the input which operates it at a point in time.
[Note: said input can be the means by which the operated meaning of Element 1 is used to program a target or itself.]
Analyze Target 1 and determine the characteristics, relationships and/or meaning, if any, that define Target I as a valid target for said operation of Element 1, as defined by its operable meaning at a point in time.
If one or more data which define Target I are a valid programming target for said operable meaning of Element 1, the Software utilizes the relevant characteristics, relationships and/or meaning of Element 1, as defined by its operable meaning, to program the valid data of Target 1.
As a result, said relevant characteristics, relationships and/or meaning defining Target1 are modified by the data defining Element 1 at the point in time of Element 1's operable meaning's programming of Target 1.
Save the result of the programming of Target 1 with an operable meaning of Element 1 to memory or its equivalent.

N. To modify certain characteristics, relationships and/or meaning, defining the result of Element 1's operable meaning's programming of Target 1, where there exists certain meaning of Target 1 which is relevant to certain meaning of said operable meaning used to program Target 1, the Software performs the following:
Analyze the characteristics, relationships and/or meaning that define Target 1.
Determine if any of this data can be used to program any one or more data that define the result of Element 1's operable meaning's programming of Target 1, referred to below as, "OM-E1."
In a key Software embodiment, the data defining OM-1E includes: (a) the meaning of the operation of Element 1 to program Target 1, (b) any data defining Element 1 as it originally existed at the time of its operation to program Target 1 and still exists unchanged by said operation, and (c) any data defining Element 1 which was modified by said operation of Element 1.
The Software determines is any of this data is a valid target for any one or more data, ("relevant data") defining Target 1.
If, such said "relevant data" is found by the Software, utilize this "relevant data" to program the characteristics, relationships and/or meaning that define the result of the programming of Target 1 by "OM-IE."
Note: in one embodiment, as part of the operation of a relationship-based programming tool, the Software performs a comparative analysis of two states of change data defining the operation of a Software content via an understanding of the meaning of said two states of change and the meaning of the input applied to operate a Software content to determine an operable meaning.

Further regarding the relationship-based programming tool.

An important processing capability of the Software, regarding its successful analytical functioning is the intelligence to connect relationships to form meaning.

Most people have the ability to determine relevance between multiple pieces of information and use this information as a means to validate or invalidate an idea, premise or point of view.

In a key embodiment, the Software determines which aspects of a first meaning (including a collective meaning), have programming relevance to a second meaning, based on the meaning of a user's operation of said first meaning. An an example only, if a user is operating a relationship-based programming tool ("T-1") where the user's operation defines or modifies that tool's programming means, (e.g., its scope, its functionality within a context, its relevancy to certain meanings, etc.), the Software determines what is being defined by said user's operation.

This determination can be accomplished via a task analysis, relationship analysis, comparative analysis or any other suitable means, as disclosed herein or known to the art. When a user applies T-1's operable meaning to program another content's meaning (e.g., "T-2"), the Software, via any means disclosed herein or known to the art, ascertains which parts of T-2's meaning are valid targets for the operable meaning being used to program them.

And, the Software assesses which parts of the meaning of T-1 (within the context by which it is being used to program T-2), are themselves a target to be programmed by certain T-2 meanings, relevant to the operable meaning of T-1.

Of note, the Software permits an infinite variety of interrelated meanings to be programmed by one or more inputs, including user inputs. In one approach, the Software is purposed to decipher both the task and intent of these inputs. And in cases where these issues are unclear to the Software, the Software engages in a dialog with the source of said input(s) to further determine their meaning, including their context of use and intent.

Software Content is Defined by Relationships

In a key embodiment, Software content is defined by characteristics, relationships and meaning that define visual, functional and/or conceptual data at one or more points in time. This content is not limited to data which includes a visual component. Said content may exist as conceptual data, ideas, and meaning which have no visual element and have no visual manifestation.

In one embodiment, the environment of the Software is a concept, a potentiality for establishing new relationships. It's a thought tool, unique to each user, for defining and connecting meaning. A Software environment is a logical construct which needs no visual component in order to exist or be operated. This environment can be driven by inputs, including user inputs, which define characteristics, relationships and meaning at any point in time. The content of this Software can be defined by an unlimited number of intertwined relationships. These include relationships between all categories of data and the meaning of this data and its relationships at points in time.

In one Software embodiment, meaning is a comprehensive understanding, including descriptive information, contexts-of-use, conditions and a host of other related data. Meaning with no visible component is operated by a user of this Software via any suitable means, including via verbal and gestural operations. In a key embodiment of the Software, meaning is defined and modified by context-of-use. This causal link between an input and its target defines primary and secondary relationships for any Software content defined by or modified by its own operation, and according to its operation to program a valid target that is a candidate for the reciprocal programming of the meaning being used to program it.

Task Analysis

A key part of a user's operation and programming of Software content is a core function of the Software, which enables it to derive a task from a user's operation of Software and non-Software data. What is a task? It is any action, operation, function, procedure, method, process, meaning or any equivalent. Tasks can result from a virtually infinite number of causalities, which include user and other inputs, the application of meanings, contexts, timed events, conditions, programmed relationships, and more. A task can be a series of actions that start at one point in time and end at another point in time.

In one embodiment, from a user's point of view, communicated meaning defines the visual, functional and conceptual data presented by programmable elements, or an equivalent, which enables a user to view and operate a Software content. In another embodiment, communicated meaning defines the meaning of data that has no visual component, yet can be programmed by an input.

User data which defines or supports the completion of one or more tasks includes in part: creating instructions, operating meaning, producing an action, function, condition or association. These tasks can be purposed for modifying any existing data, both known and unknown, and for programming original data.

From the Software's point of view, tasks include: the analysis of data, the processing, creation, and saving of Software content, and the creation and programming of programmable elements to present the result of the Software's processing, and that of associated processing systems, to a user or other operator of the Software.

Motion Media Creation

A motion media can be utilized as a programming tool. In one approach, users define their own methodologies and operate them to perform one or more tasks. A user can perform a series of operations and record them as a motion media—as change data saved to a History of Change. This change data can be used as a tool for programming itself or other data. An example of this process is the relationship-based programming tool. In one embodiment, through a comparative analysis of change data, the Software derives a task meaning. This task meaning includes the operations required to complete a specific task. In one approach, any change data that is irrelevant to the efficient performance of a defined task meaning is either purged or saved to a temporary backup storage. How does the Software know what change data is requisite for the completion of a task and which is not? In one embodiment, the Software compares the change data recorded as a motion media, or an equivalent data means, to a source of known tasks and looks for a match to the change data requisite to the completion of that task. If this data is found, the task is identified.

A comprehensive meaning can include a vast volume of defining data, including the following: (a) the characteristics and relationships defining a meaning, including, its visual and functional attributes, (b) the data elements having a primary relationship to a meaning, e.g., concepts, available research, visual or physical representations, and contexts of use, (c) known operations of a meaning as a programming tool, (d) interpretations of a meaning, and (e) modifying data that has been and can applied to a meaning.

In one embodiment, non-Software content is recreated as a set of characteristics defining a raw visual meaning. Further, relationships which, depending upon the complexity of the data being recreated at the instance of its recreation as Software content, may or may not be initially analyzed and presented in whole or in part as meaning. It is important to note, in virtually all cases, a Software content (which is the recreation of a non-Software content) is not bound by the limitations of the non-Software content from which it was recreated. This includes the non-Software content's resolution, size, dimension, focus, perspective, position, angle, frame of reference, and the available data defining the non-Software content's meaning.

With specific regards to video, the Software content recreated from this data source are not bound by the limitations of a video's aspect ratio, frame rate, frequency, compression algorithm, interframe video coding scheme, texture, depth, metadata, and other defining features.

In some cases, a user's operation of a non-Software content will determine the extent to which the Software initially recreates this content's defining data as a Software content. In one embodiment, if a user operates a non-Software content with a context of use that requires an understanding of certain meaning parameters beyond this content's raw visual meaning, the Software is automatically tasked to analyze said raw visual meaning and derive further meaning relevant to the user's operation of the non-Software content. A key indicator of user intent is a user's communication to the Software in the form of instructions, illustrations, explanations, comments and queries.

It is important to note, all Software data is infinitely changeable, whether it exists as characteristics or as any level of meaning. At any point in time, a Software content can be acted upon by an input to become all or part of something else. These inputs can be from a variety of sources, including: (a) a user, (b) one or more programmable elements, (c) a managing entity for an organization of programmable elements, (d) a primary or secondary relationship, (e) an analytical system, (f) a context, (g) a concept, (h) a timed event, (i) a relationship-based programming tool, (j) a History of Change Tool, (k) a relationship-based timeline, and, (l) the Software.

With further regard to the recreation of a non-Software content as a Software content, unless blocked by an encryption, a Software user has complete access to every aspect of a Software content's meaning at any point in time. Any user can gain access to this data by any of the following means: (a) navigating this content's History of Change, (b) querying the Software, (c) querying a Software user, (d) presenting an instruction to the Software, and (e) operating the Software content in a manner that defines a user directive, and any equivalent.

In one embodiment, as a matter of expediency, when the Software is recreating a non-Software content as a Software content, the Software does not expend resources to create meaning that is not of immediate use or that may not be required by a user. This process requires the Software to understand any one or more of the following: (a) the meaning of a user's input, (b) the user's intent, (c) the context-of-use for the non-Software content, (d) the meaning relationship between the meaning of a non-Software content and the operational methodology being applied to it, and (e) the likelihood of a certain meaning aspect of a non-Software content being utilized in the near future. Note, in one approach, item "d" is determined by the Software's assessment of use by one or more non-Software computer users.

Relevance of Relationship Meaning

In a key Software embodiment, relationship-based programming tools are about relationships between meaning presented via a context-of-use. In this embodiment, relevance is major part of the operation of a relationship-based programming tool. Software elements exist with the potential to program other elements. This potential is applicable to those elements defined by meaning having some relevance to the meaning of their own operation at a point in time.

In one embodiment of the Software, any meaning having a primary relationship, relevant to an operable meaning within a context at a point it time, can be programmed with that operable meaning. While those meanings having no relevance to this operable meaning may not be programmed.

In one embodiment, operable meaning is the meaning that results from a relevant operation of a functionality acting as a programming tool. There's the meaning of a tool itself. And there's the meaning of the operation of the tool. To the extent the meaning of said operation has relevance to the meaning of the tool, this creates an operable meaning of the tool at or about the instance of its operation.

Consider a Software user's motion applied to a Software tool to program a target. What determines the outcome of this operation? There are many factors, which include: the meaning of the motion, the meaning of the tool being operated, and the meaning of the target to which the tool is being applied.

Any valid target can modify all or part of any meaning used to program it, which is relevant to some aspect of the target's own meaning. This is referred to herein as "reciprocal programming." According to this concept, the result of the operation of a Software content to program a target, is determined by dynamically interoperable relationships whose meaning(s) are defined by the data applied to a target and the meaning of that target at the point in time of its programming.

In one set of conditions, the result of a user's operation of a tool being applied to a target depends on the meaning of the target relevant to the operable meaning of the tool being used to program the target. So, the same user operation of the same tool could have many different results based on the targets being programmed with this tool. Let's say a Software user applies the slicing motion of a sharp knife to the following elements: (a) the edge of a piece of paper, (b) a fully inflated balloon, (c) a sunbeam, (d) liquid mercury, and (e) a digital table of contents. In each case, the user's action has a different result, because the meaning of the target relevant to the action being applied to it, programs the result of the user's action.

If you use a sharp knife tool to cut the edge of piece of paper, the paper is separated along the path of the knife. If you slice into an inflated balloon, it bursts. Slice into a sunbeam and you temporarily create new light reflections. Slicing through liquid mercury does not alter its structure. And in a defined context, a user could utilize a conceptual sharp knife tool to slice away unwanted chapters of a digital document.

Additional Relationship-Based Programming Tool Perspectives

In one embodiment, the operation of a Software tool can either confirm or modify that tools' meaning. This produces an operable meaning, which when applied to a target, is itself modified by the meaning of said target, relevant to said operable meaning, to produce a result.

The final result is dynamic, but it's not necessarily causative. In one embodiment of this idea, a user controls a set of relationships, however complex they may be, which include at least two sets of reciprocal programming.

One: the operation of a tool which modifies the meaning of that tool, which is relevant to the meaning of the operation applied to it. This produces an operable meaning.

Two: the programing of the meaning of a target, whose meaning has relevancy to some aspect of the operable meaning being used to program it; and where said relevant meaning of this target modifies the result of the operable meaning's programming of the target.

Now take the result of the above sets of reciprocal programming. Call them a "result tool." Apply an operation to this "result tool" to create another operable meaning. Apply this operable meaning to another target. The meaning of this target that has relevancy to the "result tool's" operable meaning, modifies its operable meaning to produce another result. Of note, this programming (via a user or any other input recognized by the Software), doesn't require visible data for its successful operation. The targets of this programming can be conceptual data with no visual component. The Software can be used to program concepts, where the results of the programming are also conceptual data. Of course, these results can be operated to program a target with a visual component.

The Meaning of Meaning

In one embodiment, the Software, characteristics define relationships which define meaning. And meaning defines relationships which define characteristics.

In one sense, characteristics, relationships and meaning define a Software content. In another, deeper sense, meaning contains every characteristic and relationship that defines it, and this comprehensive meaning is a Software content.

In one embodiment of the Software, meaning is the Software's instantaneous knowing of what a Software content is at a point in time. From the viewpoint of a Software user, a Software content is the "State 1" characteristics that define it, or the change data that defines it at one point, or at multiple points in time.

In one embodiment, the Software, all meaning is dynamic. It is the characteristics that define an element's existence (its identity) at each point in time. Meaning is malleable according to its context-of-use. In other words, the instance of the meaning of any one or more characteristics can be redefined according to how they are operated, how they are referenced, how they are associated with other meaning.

In one approach, the Software, meaning is the understanding of a user's input(s) according to their context-of-use. Meaning can be a means of instantly programming a Software content without first analyzing its properties and deriving characteristics that define these properties. In this approach, meaning includes the analysis, research, and the derivation of characteristics and relationships that define a meaning.

In a preferred embodiment of the Software, its response to user inputs is the Software's utilization of meaning as a programming tool.

Meaning can be any of the following at any point in time.

It can be a recognition of any one or more characteristics as a known entity.

It can be a result, e.g., the result of an action, function, operation or interrelationship.

It can be a definition, based on the characteristics that define any Software element.

In can be an intent, e.g., an outcome based on a context-of-use.

It can be a causal event, e.g., a History of Change Tool, for example: "When I touch a liquid, it is turned into steam."

It can be an activation, e.g., a trigger causing the programming of certain characteristics.

It can be an organization, e.g., a composite relationship.

It can be a process programmed by user input, e.g., a Facet Tool, a Relationship-Based Timeline, a game-style encryption.

It can be an identity, e.g., the characteristics that define an element's visual attributes or functionality or conceptualization; a user's personal History of Change.

It can be a concept, e.g., a purpose, condition or even an emotion, or an idea, like freedom.

It can be an interpretation of relationships, e.g., "In what era did a horse, a crate of oranges and a two-wheel cart have significant industrial value?

It can be an expectation, like a user's expected result of an inputted instruction or operation of an element, or the expected result of a reaction, e.g., adding an acid to an alkali base.

It can be an order, like a Fibonacci sequence or a series of harmonic overtones.

It can be a reference, e.g., a primary or secondary relationship saved to a History of Change.

It can be an awareness, e.g., the knowledge of different states of change data defining one or more conditions, e.g., as the sun rises it causes shadows at different angles.

Dictionary.com defines meaning as:

"What is intended to be, or actually is, expressed or indicated; signification; import. The end, purpose, or significance of something."

In a key embodiment, as disclosed herein, and as known to the art of artificial intelligence, the Software conducts its own research and understands the relevance and meaning of what it finds.

The purpose of this next discussion is to address the following points regarding the Software's acquisition of information from the internet, such that this information can be utilized to understand and program data based on Software user input.

1. The Software's use of available internet information as a resource for its understanding the meaning of visual, functional and conceptual data, especially in light of dumbed down, exaggerated, biased, faked and other erroneous information prevalent on the Web.

2. The Software's assessment of the meaning of information according to two primary meaning genres.

(a) Global Meaning-a meaning that applies to all instances of a Software content. For example, the global meaning of flower or the global meaning of time.

(b) Form Factor Meaning-a meaning that defines distinctly different types of a content genre sharing the same global meaning.

The following is an allegorical exploration of a path of logic pursued by the Software to understand the complexities of a single term conceptually known to virtually all mankind: the hammer. When the Software enters "hammer" into the Chrome search engine, the following is the first definition presented.

"A hammer is a tool consisting of a weighted 'head' fixed to a long handle that is swung to deliver an impact to a small area of an object. This can be, for example, to drive nails into wood, to shape metal (as with a forge), or to crush rock. Hammers are used for a wide range of driving, shaping, and breaking applications."

According to this definition, there's a set of conditions shared by all hammers. These conditions are: (a) two physical attributes (a weighted head, and a long handle), (b) an operational meaning (it is swung), and (c) a functional meaning (it delivers an impact to a small area of an object).

Figure 23:
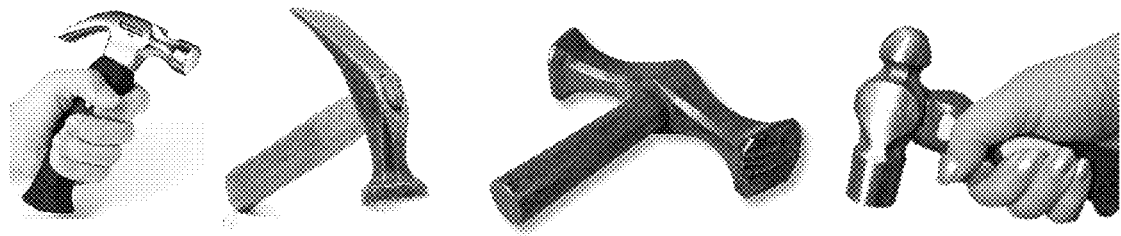
FIGS. 23-27 depict some examples of tools.

Let's say the Software considers these definitional conditions as the global meaning for a hammer—a meaning that applies to all hammers. Then, according to this definition's meaning, the tools depicted in FIG. 23 are not hammers.

These hammers fit every aspect of the hammer definition except for one word, "long." These hammers don't have long handles. But then what is the definition of "long" as an adjective?

If the Software goes to the internet, this may be the first definition that appears: long[1]

/lôNG, läNG/

Figure 54:
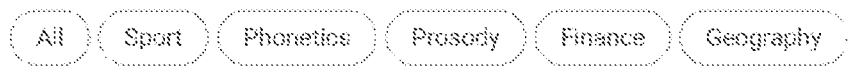
FIG. 54 depicts an example list of definition categories.

See definitions in, as shown in FIG. 54.

Adjective

"Measuring a great distance from end to end." "A long corridor."

Based on this information, the Software concludes the above items with short handles (about the length of a person's hand), cannot be hammers.

Now, let's say in order to determine the meaning of these items, the Software presents them to the Google Images window.

Figure 24:
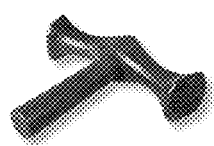

When the Software presents the tool depicted in FIG. 24, it gets the following response.

Figure 25:
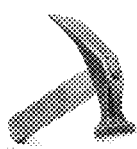

"Possible related search: metalworking hand tool." When the Software presents the tool depicted in FIG. 25, it gets this response.

"Possible related search: framing hammer."

Figure 26:
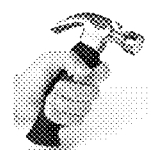

When the Software presents the tool depicted in FIG. 26, it gets this response.

"Possible related search: hammer."

Figure 27:
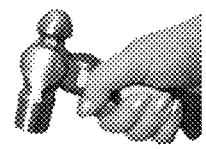

When the Software presents the tool depicted in FIG. 27, it gets this response.

"Possible related search: hand."

So what's the accuracy of this information? The first tool has a pewter head. That would make this tool useless for shaping any metal of a greater hardness. Modern pewter is made from 95% tin, plus some copper and antimony. According to Mohs Scale of Hardness, tin has the same hardness as lead, 1.5. Copper is 3, iron and steel is 4 to 4.5, and hardened steel is 7 to 8. A metalworking tool? I don't think so.

The second tool is a cobbler's shoemaker's hammer. You couldn't use it for framing. The third tool is a claw hammer with a short handle. The fourth tool is not a hand. It's a ball-peen hammer being held in one's hand.

In one embodiment, the Software enters "hammer" into a Google image search. Not surprisingly, every short-handled tool researched by the Software was found in the Google Images search, supplying proof positive that these tools are hammers.

Figure 28:
FIG. 28 depicts an example of an images search

FIG. 28 depicts an example of the images search.

So, what does this information tell the Software regarding the validity of the term "long" in the dictionary.com definition of hammer? This term must be removed from the global definition of a hammer.

As a result of this new information, the Software changes its global hammer definition to this:

"A hammer is a tool consisting of a weighted 'head' fixed to a handle that is swung to deliver an impact to a small area of an object . . . ."

Now, the Software reasons: "Are there other hammers that don't fall under this new global definition of a hammer?" To answer this question, the Software searches for other types of hammers and compares their meaning to its new global hammer definition.

The Software Finds the Flintlock Rifle.

Figure 29:
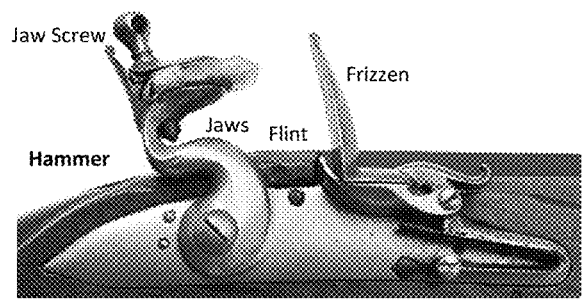
FIG. 29 depicts an example of a hammer mechanism that strikes the firing pin in a flintlock rifle.

FIG. 29 depicts an example of a hammer mechanism that strikes the firing pin in a flintlock rifle. It has a weighted head and an S-shaped handle. It is swung forward, but not manually. It doesn't deliver an impact to a small area. The flint strikes a steel frizzen when the trigger is pulled. The resulting friction produces a spark which shoots into the priming pan of a musket's barrel.

Is this a hammer? The answer must be "no." Why? It is not swung by a user. The hammer is part of a larger a mechanism, activated by a causal event, the pulling of a trigger. But there are practical reasons why this is not a hammer. Practical meanings may be the hardest things for the Software to understand. Two practical meanings of a hammer are: (a) it's a manual tool; its force is supplied by a person, not a mechanism or machine, e.g., the meaning of a die cutting press machine is not the same as a hand-held hammer, and (b) its accuracy is controlled by the person wielding it, again, not a mechanism or machine. These practical meanings have a primary relationship to the operation of a hand-held, hand powered hammer and are a part of its global meaning.

The Software Finds the Piano Hammer Mechanism.

Figure 30:
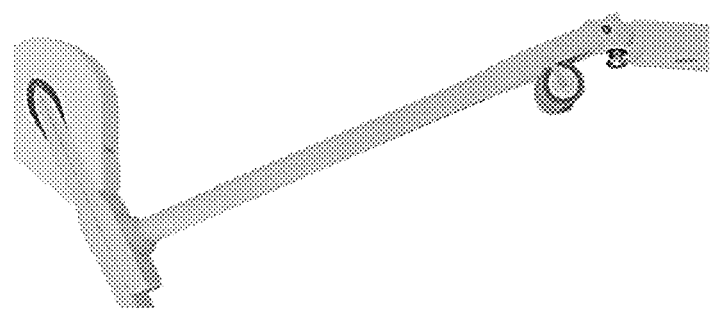
FIG. 30 depicts an example of a piano hammer.

Piano hammers are felt-covered mallets that strike against a piano's strings. These hammers have a weighted head and a handle. They are swung forward when a piano key in depressed on its keyboard. They do deliver an impact to a small area of an object. The object in this case is a piano string. Each piano hammer hits either a single string, or a two or three string set at a specific point, which equals the width of the hammer and a small area at the outermost curvature of the hammer. FIG. 30 depicts an example of a piano hammer.

So, is this a hammer? According the Software's definition of a hammer it complies with a hammer's global meaning, but not its known practical meanings.

Figure 31:
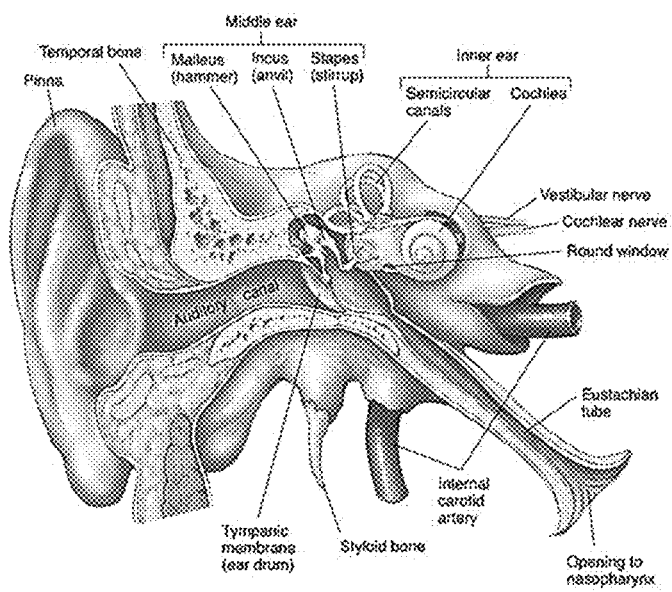
FIG. 31 is an example diagram of the "Malleus."

There's a bone found in the middle ear, called the "Malleus", often referred to as a hammer. FIG. 31 is an example diagram of the "Malleus."

It does not fit the any part of the global definition of a hammer.

The malleus receives vibrations from the tympanic membrane and transmits these to the incus. The term "hammer" is a medical metaphor which has nothing to do with a hand-held tool.

The Software Finds the Welding Chipping Hammer.

Figure 32:
FIG. 32 depicts an example of a chipping hammer.

A chipping hammer has a weighted head and long handle. It is operated by swinging it and hitting a weld to shatter the slag. It's also operated by sliding it along a weld to remove spatter. As a hitting tool, it does deliver an impact to a small area of an object, in this case a weld. FIG. 32 depicts an example of a chipping hammer.

The chipping hammer fits the three conditions of Software's global definition of a hand-held hammer.

The fact that is can also be slid along a weld, doesn't invalidate its being classified as a hammer.

The Software Finds the Track and Field Hammer.

Figure 33:
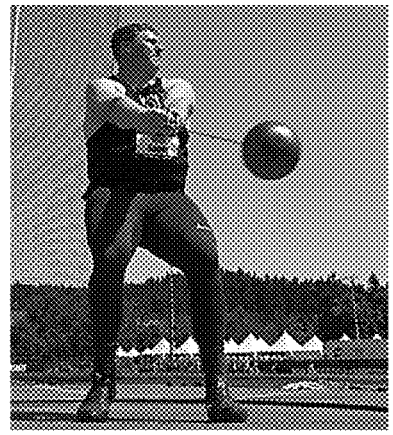
FIG. 33 depicts an example of a person playing a track and field hammer.
Figure 34:
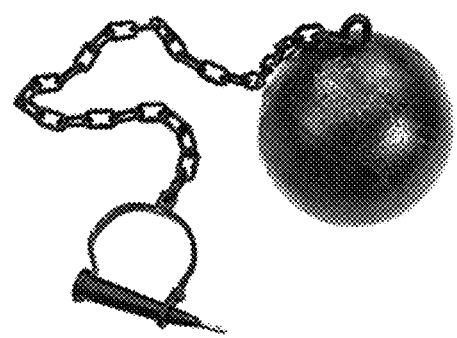
FIG. 34 depicts an example of a track and field hammer.

This is the athletic tool for the hammer throw. This hammer does not fit any global definition for the hand-held hammer. It has a handle, but it's attached to a chain. It is swung, but not for the purpose of striking a surface. It is thrown. And when it lands, it does deliver a force to a small impact area, but it can bounce, slide and roll after striking a surface. And its purpose is not to apply force to anything, but to have the distance it's thrown measured. FIG. 33 depicts an example of a person playing a track and field hammer. FIG. 34 depicts an example of a track and field hammer. So, in this context, the term hammer is an athletic metaphor, not a hand-tool definition.

The Software Finds Fantasy Hammers.

There's Thor's Hammer.

It has a weighted head and a handle.

It is swung. But can also be thrown great distances and return to Thor when called.

It does deliver an impact to a small area, even though it can be used to destroy and entire planet.

Figure 35:
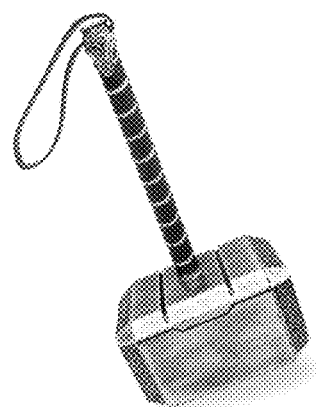
FIG. 35 depicts an example of Thor's Hammer.

Thor's hammer enables its wielder to fly, and it has other powers such as teleportation, invisibility, interdimensional messaging, and the ability to distinguish images, holograms, and different illusions from reality. FIG. 35 depicts an example of Thor's Hammer.

Does this meet the global definition of a hammer? Yes.

There's Drang Hammers.

Figure 36:
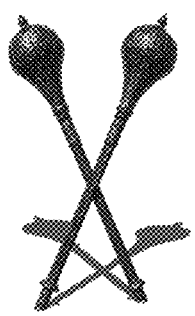
FIG. 36 depicts an example of a Drang Hammer.

These hammers fit the global physical meaning a hammer. Drang Hammers have a weighted head and a handle. Their operational meaning extends beyond being swung. They can be used to stab and affect magical damage. FIG. 36 depicts an example of a Drang Hammer. Drang Hammers can be used to affect damage to a specific area, but they can also be rolled to affect a wider area. Technically, Drang Hammers meet the criteria of the Software's global meaning of a hammer.

Figure 37:
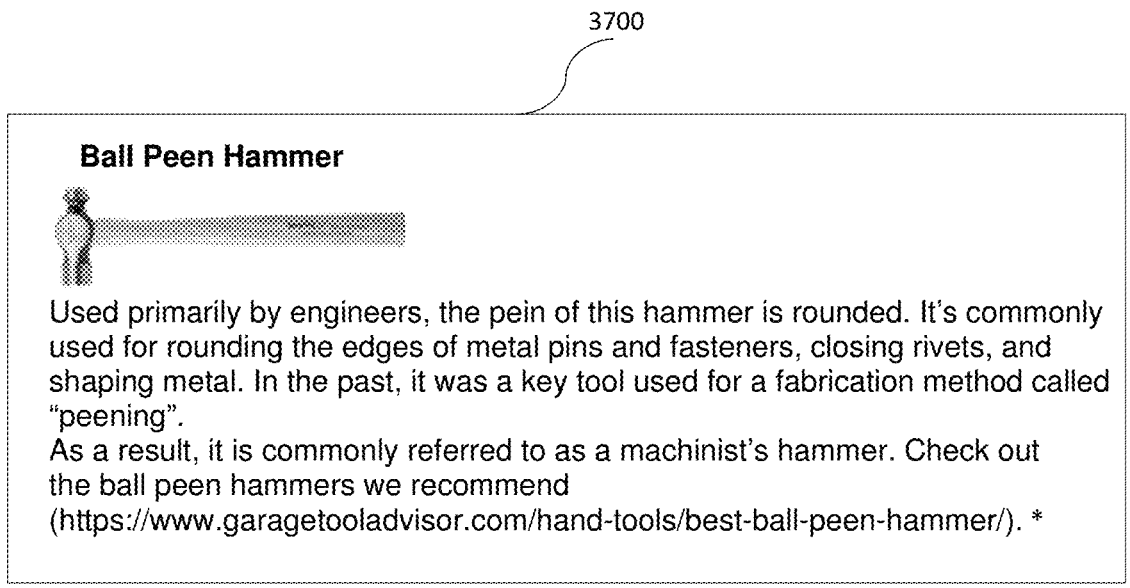
FIG. 37 depicts one example from a search result document.

Now let's say as a part of its research, the Software finds a document entitled: 40 Different Types of Hammers and Their Uses. Under the subhead: "Common Hammers" there are 40 images of hammers, each accompanied with a picture. FIG. 37 depicts one example 3700 from this document.

* This document includes two mechanical hammers, a nail gun and a power hammer. There are many other mechanical devices called hammers, for example, the trip hammer (aka tilt hammer or helve hammer), is a massive powered hammer used to polish grain in agriculture and crush metal ore.

This brings us right back to the practical meaning of a hammer. It is not a powered device. It has no moving parts. It is not self-activating. It is not part of a mechanical system.

With this information, the Software again modifies the global meaning of a hammer.

"A hammer is a tool consisting of a weighted 'head' fixed to a handle that is swung by a person to deliver an impact to a small area of an object."

In further reference to the above cited article, it cites approximately 40 hammer tools which match the Software's global definition of a hammer.

In considering these 40 hammer tools, each of them has a unique form factor meaning. This meaning is defined by a specific set of characteristics which include: (a) visual meaning—the physical shape, color, texture, and other visual attributes, (b) functional meaning—the weight of the hammer, the task performed by the hammer, and how the hammer is operated to perform the task, and (c) conceptual meaning-anything the hammer could be used for, including its generally accepted use, but also other uses for which it would be a suitable tool.

So, how would this meaning of a hammer exist in the Software's digital apprehension of meaning? The global definition of a hammer logically contains at least 40 different form factor meanings, all of which have the same practical meanings.

These practical meanings include: (a) a hammer is held in a person's hand(s), (b) its force is supplied by the person wielding it, not by a mechanism or machine, and (c) its accuracy is controlled by the person using it, (d) it is not a powered device, (e) it has no moving parts, (f) it is not self-activating, and (g) it is not part of a mechanical system.

How does the Software acquire an understanding of practical meaning? Where it cannot be found in existing knowledge, it's supplied by Software users.

With a detailed understanding of the global and form factor meaning of a particular hammer, the Software can immediately program any valid target in a Software environment. The larger value here is, this approach can be used by the Software to utilize the global and form factor meaning of anything as a programming tool with instantaneous application to any valid target. It's instantaneous because each meaning includes every characteristic and relationship that defines it.

It's the practical meaning of a hammer, applied to the form factor meaning of a particular hammer, that forms the next topic of discussion, which explores "out-of-the-box" programming with hammer meaning.

Figure 38:
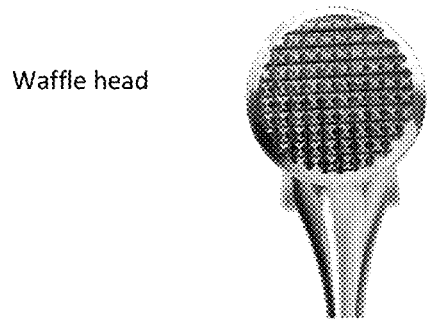
FIG. 38 depicts an example of a waffle head hammer.
Figure 39:
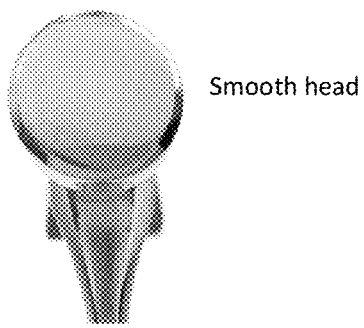
FIG. 39 depicts an example of a smooth head hammer.

Here's a question. Can a hammer be slid across a surface? Yes. This is why the waffle tip framing hammer was invented. A smooth head framing hammer can easily slip off the surface of a nail, especially when being used to drive a non-galvanized framing nail into wet framing lumber. FIG. 38 depicts an example of a waffle head hammer. FIG. 39 depicts an example of a smooth head hammer.

What is the value of this practical meaning of a hammer to a Software user?

A user's operation of Software content can be used to modify its meaning at a point in time. So, if a user operates a smooth head hammer as defined by its global and form factor meaning, that should be its meaning at the instance of its operation. Right? Well, not exactly. The manner in which the hammer is swung (a factor in determining its applied force), and the material being struck by the hammer (this affects the result of the hammer's applied force), modifies the hammer's practical meaning when it is operated. Now let's say a user takes any hammer with a smooth head (a sledge hammer, framing hammer, a tack hammer, etc.), and purposely moves it onto a surface, and slides it across that surface (let's say to smooth out or scrape off paint bubbles that appeared after a wet wooden beam was mistakenly painted).

What is the meaning of this operation of the hammer?

Let's say the hammer is a ball-peen hammer. How does the Software make sense out of this context-of-use? In other words, how does the Software create a new meaning that includes: (a) the global and form factor meaning of the ball-peen hammer and its associated practical meanings, (b) an operation unanticipated by its global functional meaning, and (c) the result of its unanticipated applied force to an object, in this case a surface containing paint bubbles?

A first analysis could be a question: "Which parts of the global definition of a hammer apply to this hammer's operation, and which do not?" There are three parts to this definition: (1) two physical attributes, (2) an operational meaning, and (3) a functional meaning.

The global definition of a hammer clearly applies to the ball-peen's physical attributes. This should be indisputable as far as the Software is concerned. It has a weighted head and a handle. Regarding its operational meaning, this raises a question. Is being pushed downward to a surface the equivalent of being swung? This requires a more in depth understanding of the term "swung" by the Software. In one embodiment, this involves an aspect of the Software's functioning. Here, the Software must know when the meaning of a Software content has been changed, and how it has been changed, according to its context-of-use.

The relationship between meaning and context-of-use is a natural part of a human's cognitive sense of things, although the perception of meaning varies greatly from one human culture to another. Let's say you close your eyes and visualize someone swinging a hammer. What do you see? If you have actually swung a hammer before, you are likely to see something akin to the following description.

Figure 40:
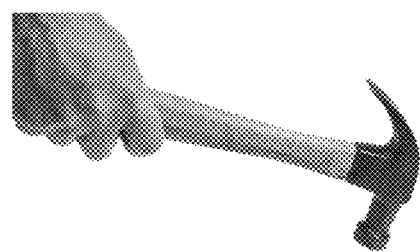
FIG. 40 depicts a hand grasping a hammer.
Figure 41:
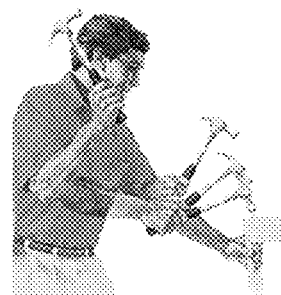
FIG. 41 depicts a person swinging a hammer.

Someone is grasping their hand around a hammer's handle far from the hammer's head. (You realize the farther towards the back end of the handle, the greater the swinging force.) Then the hammer is moved slowly up over the person's shoulder where it is paused for a second. Then it's moved very quickly forward in an approximate 90° arc until it hits a surface. FIG. 40 depicts a hand grasping a hammer. FIG. 41 depicts a person swinging a hammer.

How does this compare to the motion of pushing the face of a hammer towards a surface? Now close your eyes and visualize grabbing the head of a ball-peen hammer and pushing it down onto a surface. If you have ever done anything like this, you might see the following in your mind.

A person grasps the head of a ball-peen hammer in their fist, with their fingers wrapped around the pein of the hammer. The palm of their hand is positioned above the hammer's head. They push the head down to a surface with the hammer's handle extending outward away from their hand. The full weight of the handle is supported by the strength of the person's grasp on the hammer's head.

Figure 42:
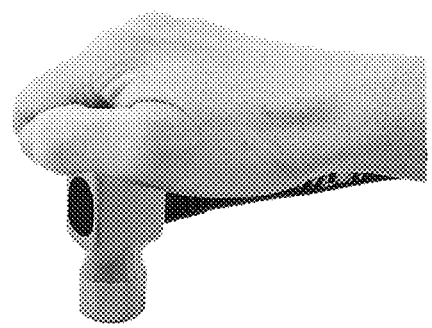
FIG. 42 depicts a hand grasping a hammer's head.

FIG. 42 depicts a hand grasping a hammer's head.

So how does the Software understand the meaning of this user's operation of a ball-peen hammer? Here's another question: "Does a motion that pushes down once qualify as "being swung?" One could argue that it does, or that it doesn't.

It does, if a swinging motion can be in one direction, one time. It does not, if a swinging motion must move constantly back and forth.

This is an important aspect of Software reasoning regarding undefined terms in a user's instruction. Users are going to present elements with complex relationships to other elements. But when the user presents these elements, they will usually have an understanding of the practical meaning of these elements in their head. To the extent the user assumes the Software knows what's in their head, they do not define this meaning, and the Software is left to decipher this meaning on its own.

Now what's better for the user, a Software whose knowledge base is: (a) filled with characteristics, or (b) filled with meaning that includes the characteristics and relationships that define it? Operating known meaning is immediate. Analysis, even via a supercomputer, can take more resources.

In a preferred embodiment, the Software conducts its own research. This is an easy statement to make, but it represents a vast set of near infinite learning pathways. A critical part of the Software's acquisition of meaning is its understanding of the definitions of words and phrases.

In one approach, the Software's discernment of meaning will likely occur every time it encounters a word or phrase in an instruction that has not been clearly defined by a Software user.

Now words are one thing, but how many meanings of each word exist? Not counting every Software users' unique context-of-use, a simple dictionary definition can contain many meanings for a single word according to its grammatical use. Some words can be both a verb, noun and adjective. And their meaning is molded by the words associated with their use in a sentence.

Although English words are not generally characterized according to classes, there basically nine English word types: verbs, adjective, nouns, adverbs, pronouns, conjunctions, prepositions and exclamations. This adds up to a massive number of word combinations whose meaning must be deciphered by the Software.

It can be a challenge to extract precise meaning from a single dictionary definition. So, is this an impossible task for the Software? No, it is not. On the one hand, the Software must have access to an ever-expanding volume of resource data, both factual and fictional.

But at the same time, the Software will be tasked with interpreting Software users' operations of Software content, and instructions. These instructions will often be accompanied by supplementary information including: pictorial content, motion content, the manipulation of analog objects, digital elements, the performance of gestures, facial expressions, body movements, the list goes on.

Through all this information, the Software is being tasked to understand the user's meaning and intent. In certain cases, users' explanations may make it harder for the Software to understand what the user is asking it to do. But as a rule, user supplied definitions and explanations should increase the Software's ability to understand the meaning of their inputs.

Next, consider a reasoning by which the Software utilizes the meaning of words and phrases presented in a dictionary definition to form a global meaning for a Software content. In a key embodiment, visual, functional, and conceptual data are all Software content. And meaning is a Software content. In a key embodiment of the Software, a global meaning acts as the meaning of a meaning.

The following discussion is only the very tip of a reasoning methodology for the Software.

This discussion starts with the continuation of the ball-peen hammer use case. The Software is being tasked to understand the meaning of a user's operation where a ball-peen hammer is being pushed downward to a wooden surface. (Well, that's the first part of the user's operation.) And this brings us back to this question: "Is being pushed downward to a surface the equivalent of being swung?"

The Software reasons, what does it mean to say a hammer has a handle "that is swung?" Even with the addition of the phrase "by a person" to clarify the global meaning for a particular class of commonly used hammers, the term "swung" is not specifically defined in this global meaning. Left undefined, its definition must be defined by existing dictionary or encyclopedic definitions, or by user definitions. Below is the Dictionary.com definition for the word swing.

swing swɪŋ /PHONETIC RESPELLING verb (used with object), swung, swing ing.

to cause to move to and fro, sway, or oscillate, as something suspended from above: to swing one's arms in walking.

to cause to move in alternate directions or in either direction around a fixed point, on an axis, or on a line of support, as a door on hinges.

verb (used without object), swung, swing-ing.

to move or sway to and fro, as a pendulum or other suspended object.

to move to and fro in a swing, as for recreation.

noun the act, manner, or progression of swinging: movement in alternate directions or in a particular direction.

the amount or extent of such movement: to correct the swing of a pendulum.

In one embodiment, as the Software considers the meaning of the word swung in the above definition, it recognizes the type of the word swung according to its use in the hammer global definition. The Software must know it is being used as a verb. Also, the Software must know how to find the part of the Dictionary.com verb definition which applies to the use of an object. The hammer is an object. It is not being referenced. The verb swung describes the manner in which a hammer is operated. By any means disclosed herein or known to the art, the Software analyzes the verb definitions of swing (swung, swing-ing) used with an object.

The verb's definitions include these phrases: to move to and fro; to oscillate; to move in alternate directions. And then there's this: "to cause to move in alternate directions or in either direction around a fixed point." The Software must understand this underlined phrase includes the meaning: "in just one direction," as opposed to moving back and forth.

Also, the fixed point around with a directional movement occurs is a person's elbow. That's another relationship for the Software to understand. A person's elbow is only a theoretical fixed point, as no person holds their elbow perfectly still when they wield a hammer. This is another part of the practical meaning of the word swung as it applies to the operation of a hand-held hammer.

Therefore, the Software adds this to the practical meanings of the global hammer meaning creating the following practical meaning collective: (a) a hammer is held in a person's hand(s), (b) its force is supplied by the person wielding it, not by a mechanism or machine, and (c) its accuracy is controlled by the person using it, (d) it is not a powered device, (e) it has no moving parts, (f) it is not self-activating, (g) it is not part of a mechanical system, and (h) its swinging motion can include being moved forward in one direction where the central point for its movement is a person's elbow or shoulder. When someone uses a hammer to pound a nail into a board, they generally hit the nail again and again until it's driven sufficiently far into the board. This would be in keeping with the "to and from" definition of "swung."

But, because of the underlined phrase, in either direction around a fixed point, if someone moves a hammer one time from a first position to a second position to deliver an impact, this is a valid operation of a hammer, according to its global meaning, which includes the above meaning of the word swung, exemplified in the added practical meaning, item "h." So, if you drive in a nail with one blow, this swung hammer operation falls under the Software's global meaning of a hammer.

The meaning of this underlined phrase serves to answer the question: "Does a motion that pushes downward to a surface qualify as a swinging motion?"

According to this definition of swung (in either direction around a fixed point) a hammer can be moved forward one time to impact an object. So, unless a user manages to push a hammer downward where their elbow and hand remained perfectly parallel, pushing a hammer downward one time to impact a surface is part of the global definition of a hammer. However, based on this reasoning, this meaning would not include dropping a hammer to cause it to impact an object.

The entire reasoning so far is based on a single source definition from Dictionary.com. So, let's test the Software's global meaning of a hammer against two other definitional sources: the Webster's New World dictionary @ 1959, and the 2020 version of the Encyclopedia Britannica. As it turns out, these sources include every hammer object discussed thus far. There's the firing pin in a firearm, an athlete's hammer (as in a hammer throw), a piano key's hammer, the malleus in the ear, a trip hammer, a claw hammer, and even a reference to a rock being used as a hammer.

The Encyclopedia Britannica had only one reference to the term swung. "In hammer hafting, it is possible to distinguish between longs handles that allow tools to be swung to give them speed . . . " The Webster's New World dictionary had no reference to a hammer being swung.

There's language like: "for pulling nails," "that strike against the strings" of a piano. These definitions require the reader to understand the operation of these devices. These definitions focus on the physical attributes of hammers, with a minimal mention of functional meaning.

Here's a question. What's the purpose of a global meaning for the Software? In a key embodiment, this purpose is to facilitate the Software's immediate knowing of the meaning of a content, such that this meaning can be instantly applied to operate said content and/or to program another meaning (e.g., another Software content). In one Software embodiment, the scope and detailed validity of the programmability of a meaning are defined by the practical meanings of a global meaning, and by the form factor meaning of the specific element defined by that global meaning.

In this embodiment there are at least three meanings: (a) a global meaning, (b) a form factor meaning, and (c) a practical meaning. There are at least two approaches here: (1) one or more practical meanings define the scope of a global meaning, which is further defined in scope by at least one form factor meaning, and (2) one or more practical meanings define the scope of a global meaning, which is further defined in scope by a form factor meaning, which is further defined in scope by one or more practical meanings.

Both approaches may have merit, but let's say the Software uses "2" as its meaning logic for the Software elements associated with this discussion. What's the purpose of these interrelated meanings? They are a means by which the Software can quickly or instantly know meaning (which includes the characteristics and relationships that define that meaning) and utilize said meaning to program Software content defined by a user's operation of one or more Software elements, and/or a user's instructions presented to the Software.

Does the Software have a reliable global meaning for a hand held, hand operated hammer? We're not there yet. The problem is, the dictionary and encyclopedic definitions that define "hammer," apply this term to a wide range of disparate functionality.

According to the three definitions acquired by the Software, the form factor meanings of many of the hammer objects are so unalike, there is no attributable global meaning other than the application of a force to something. As far as the Software is concerned this could be a definition for the term "wind."

In one Software embodiment, the reasoning effectiveness of the Software is determined by the following concept: "An understanding of relevant detail." Detailed meaning is an effective meaning programming tool. Generalized meaning offers less to support the Software's ability to respond to the details presented in a user's instruction, or as defined by a user's operation of a Software content.

So, what is a viable global meaning for a hand held, hand operated hammer? It could be this:

"A hand-powered hammer is a tool consisting of a weighted 'head' fixed to a handle that is swung by a person to deliver an impact to a small area of an object." With this definition, the Software has a scope of use that is specifically definable for each form factor meaning applied to it. This brings us right back to the article entitled "40 Different Types of Hammers and Their Uses." Every hammer, and potentially others not included in this article, have their own unique form factor meaning. This includes everything from a drywall hammer to a hatchet hammer. Yet, every one of these hammers is defined by the same global meaning. This gives the Software great programming power.

What is this power? Consider a person who has a vast knowledge of something. Let's say it's how to lay a carpet. Now you ask this person about how to cut and stretch a carpet into a highly irregular shaped room. They know every aspect of this operation, because they know all the problems they've encountered in performing operations like this in the past and how they solved them.

Consider the Software having this depth of knowledge for hundreds of thousands or even multiple millions practical meanings pertaining to a single form factor meaning of a global meaning.

In one embodiment, this understanding would include two key pieces of data: (a) the practical meanings of every input used to program this form factor meaning by users all over the world, and (b) the Software's returned result for each of these inputs. With this scope of understanding, the Software would be in a strong position to apply this form factor meaning to program a wide variety of valid targets.

Now, I want to address the remaining part of the of the ball-peen hammer's operation. This hammer is being pushed down onto a surface with a user's hand. A full description of this operation appears below, followed by an illustration of the placement of the ball-peen hammer on a wood beam surface.

"A person grasps the head of a ball-peen hammer in their fist, with their fingers wrapped around the pein of the hammer. The palm of their hand is positioned above the hammer's head. They push the head down to a surface with the hammer's handle extending outward away from their hand. The full weight of the handle is supported by the strength of the person's grasp on the hammer's head."

"A user takes the flattened head of a ball-peen hammer and moves it onto a surface, and slides it across that surface to smooth out or scrape off paint bubbles that appeared after a wet wooden beam was mistakenly painted."

Figure 43:
FIG. 43 depicts an example of a flattened head of a ball-peen hammer being used to slide across a surface to smooth out or scrape off paint bubbles.

FIG. 43 depicts an example of a flattened head of a ball-peen hammer being used to slide across a surface to smooth out or scrape off paint bubbles.

How does the Software incorporate the above operation of a ball-peen hammer into a meaning programming tool?

Let's revisit the Software's global meaning for a hand-powered hammer.

"A hand-powered hammer is a tool consisting of a weighted 'head' fixed to a handle that is swung by a person to deliver an impact to a small area of an object."

Here's the practical meanings for the hammer global meaning: (a) a hammer is held in a person's hand(s), (b) its force is supplied by the person wielding it, not by a mechanism or machine, and (c) its accuracy is controlled by the person using it, (d) it is not a powered device, (e) it has no moving parts, (f) it is not self-activating, (g) it is not part of a mechanical system, and (h) its swinging motion can include being moved forward in one direction where the central point for its movement is a person's elbow or shoulder.

What about the form factor meaning of the ball-peen hammer? Above, a form factor meaning has been referred to as one of the three basic meanings of a Software element. What is the form factor meaning of a hammer defined by the above global hammer meaning? It's meaning pertains to the defining characteristics of a specific type of hammer, in this case, a ball-peen hammer.

Figure 44:
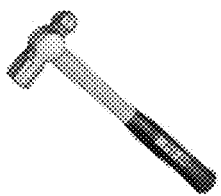
FIG. 44 depicts an example of information that could comprise the form factor meaning of a ball-peen hammer.

Form factor meaning can be voluminous in nature. It can include every known aspect of the visual, functional and conceptual aspects of a specific Software element. In one approach, this information is organized according to a number of different categories of meaning. FIG. 44 depicts an example of information that could comprise the form factor meaning of a ball-peen hammer.

Purpose:
  Smaller ball-peen hammers can be used in model boat making, whereas larger ball-peen hammers can be used to shape metal parts. A larger ball-peen hammer can be used for surface hardening by impact, a process called "peening." The flat face of ball-peen hammers can also be used for striking punches and chisels. The ball end of the hammer is useful for rounding off edges of metal pins and fasteners.

Occupational Applications:
  Boiler makers: construct, assemble, maintain, and repair stationary steam boilers and boiler house auxiliaries. Align structures or plate sections to assemble boiler frame tanks or vats.
  Farm equipment: maintain, repair, and overhaul farm machinery and vehicles, such as tractors, harvesters, and irrigation systems. Dismantle defective machines for repair, using hand tools.
  Millwrights: install, dismantle, or move machinery and heavy equipment; insert shims.
  Pipe fitters: hammer pipes to specifications.
  Precious metal workers: hammer to shape gold, silver, pewter or other metals to form jewelry or other metal items such as goblets and candlesticks.
  Sheet metal: hammer to straighten sheet metal; shaping metal over anvils, blocks, or forms.

Historical:
  Before the invention of the pneumatic rivet gun, ball-peen hammers were used for riveting. The flat head drove the nail through and the round ball end was used to "peen over" the other side of the rivet so it stayed in place.

Practical:
  Compared to most framing hammers, the head of full-size ball-peen hammers is proportionally heavier in relation to the weight of its handle. This makes the head of a ball-peen hammer a good choice for directly grasping its head in one's hand and using it as a pounding tool, e.g., for more controlled close in pounding, like reforming soft metal or malleable clay.

Considering this practical meaning of the form factor meaning of a ball-peen hammer, does this operation come under the global definition of a hammer? Below is an example of a reformed Software global hammer definition.

"A hand-powered hammer is a tool consisting of a weighted 'head' fixed to a handle that is swung by a person to deliver an impact to a small area of an object."

According to this Software global definition, there are three sets of conditions shared by all hand-held hammers. These conditions are: (a) two physical attributes (a weighted head, and a long handle), (b) an operational meaning (it is swung), and (c) a functional meaning (it delivers an impact to a small area of an object).

In consideration of this definition, does the functional meaning of pushing of a ball-peen hammer's head onto a surface fall within the Software's hand-held hammer's global functional meaning? In one approach, to answer this question the Software analyzes a definition of the word impact.

Below is the Dictionary.com definition of impact.

impact
[noun$^{im\text{-}pakt}$; verb im-pakt]
noun
the striking of one thing against another; forceful contact; collision: The impact of the colliding cars broke the windshield.
an impinging: the impact of light on the eye.
verb (used with object)
to drive or press closely or firmly into something; pack in.
to fill up; congest; throng: A vast crowd impacted St. Peter's Square.
verb (used without object)
to have impact or make contact forcefully: The ball impacted against the bat with a loud noise.
to have an impact or effect: Increased demand will impact on sales.

The Software reasons, what is the context-of-use of the word impact in the Software's global hammer definition? It is a noun. The global hammer meaning says: "to deliver an impact." So, the Software looks for the noun definition of impact in the Dictionary.com definition. It finds this: "the striking of one thing against another; forceful contact, collision." But the definition also includes this noun definition: "an impinging: the impact of light on the eye." This is not a forceful contact.

So, does pushing a hammer's head onto a surface fall within the definition of the Software's hammer global functional meaning? The answer to this query is "yes." In one approach, there are two parts to the operation of the ball-peen hammer: (a) it is pushed downward until it contacts a surface (in this example, the surface of a wood beam), and (b) the head of the ball-peen hammer is slid along this surface. Does this second movement, the sliding of the ball-peen's head along a surface, match the functional characteristics of the Software's global hammer's functional meaning? The answer is "No." Does this sliding ball-peen movement match the functional characteristics of the form factor meaning of a ball-peen hammer? The answer is also "No."

Is this second movement defined by the practical meanings which modify the scope of the global hammer meaning?

Here is the collective of practical meanings: (a) a hammer is held in a person's hand(s), (b) its force is supplied by the person wielding it, not by a mechanism or machine, and (c) its accuracy is controlled by the person using it, (d) it is not a powered device, (e) it has no moving parts, (f) it is not self-activating, (g) it is not part of a mechanical system, and (h) its swinging motion can include being moved forward in one direction where the central point for its movement is a person's elbow or shoulder.

The answer to the above question is also "No." Sliding a hammer along a surface cannot be construed as a swung motion, even one that moves in one direction where the central point for its movement is a person's elbow or shoulder.

Does this sliding movement across a surface match any practical meaning modifying the scope of the ball-peen hammer's form factor meaning? The answer is, once again, "No." Below is the practical meaning of the ball-peen hammer's form factor meaning. "Compared to most framing hammers, the head of full-size ball-peen hammers is proportionally heavier in relation to the weight of its handle. This makes the head of a ball-peen hammer a good choice for directly grasping its head in one's hand and using it as a pounding tool, e.g., for more controlled close in pounding, like reforming soft metal or malleable clay."

What's the point of all of this? The point is to connect meanings together in ways that are justified by one or more existing relationships defining a cohesive meaning. Why? Because every meaning having at least one primary relationship to one of the meanings directly defining or modifying the scope of a meaning, comprises a solid associative logic for accessing and thereby knowing this meaning, and thereby utilizing this meaning as a meaning programming tool.

Close your eyes and think about live cat. What do you see? In all likelihood, you see characteristics pertaining to a cat you've owned or had experience with. This is the speed and clarity of your knowing. Your own experience. This is the strongest type of human knowing. This is the type of knowing the Software can utilize instantly as a programming tool.

All memories you have of this cat likely fall within your global meaning of a cat, modified to some extent by practical meanings, which depending upon the impression they made on your memory, are just as vivid and just as instantaneous as your global knowing of the meaning of a cat.

When I think of a cat, the first thing I think of is playing with my cat when I was 8, where I would move my toes under the bed covers and my cat would pounce on the movement of the covers. What were the physical attributes of this cat? It was gray, small, and had very soft fur. What were the operation characteristics of this cat? It was very fast and could pounce very quickly. What was the functional meaning of this cat? It had very sharp claws and teeth, which cut right through the covers to my toes.

This is the framework from which the Software should know meaning. To the extent this is feasibly possible, the Software's acquisition and use of meaning as a programming tool, should be instantaneous.

Below is a summary of the above conclusions regarding the sliding of a ball-peen hammer along a surface. Does it match the functional characteristic of the Software's global hammer meaning? "No." Does it match the functional characteristic of the form factor meaning of a ball-peen hammer? "No." Does it match the practical meaning which modify the scope of the global hammer meaning? "No." Sliding a hammer along a surface cannot be construed as a swung motion, even one that moves in one direction where the central point for its movement is a person's elbow or shoulder. Does it match any practical meaning modifying the scope of the ball-peen hammer's form factor meaning? "No."

So, what does the Software do with this information?

The following is a reasoning that answers this question. The global meaning for a hammer includes two physical attributes: a weighted head and a handle. These attributes include at least 40 known form factor meanings of different hand powered hammers. Any of the heads of any hammer whose physical attributes are defined by the Software's global hand powered hammer meaning, can be grasped by a person's hand and pushed downward to a surface and slid along that surface. So, this operation could apply to any of these 40 form factor meanings.

As a result of this fact, this operational meaning is added to the practical meaning of the hand-powered hammer global meaning, instead of to the form factor meaning of the ball-peen hammer. So the practical meanings for the hammer global meaning now read: (a) a hammer is held in a person's hand(s), (b) its force is supplied by the person wielding it, not by a mechanism or machine, and (c) its accuracy is controlled by the person using it, (d) it is not a powered device, (e) it has no moving parts, (f) it is not self-activating, (g) it is not part of a mechanical system, (h) its swinging motion can include being moved forward in one direction where the central point for its movement is a person's elbow or shoulder, and (i) the head of a hammer can be slid across a surface for any purpose.

Of note, the immediacy of knowing a meaning is knowing how it is logically interconnected to the characteristics that define it. This is true for a person and it should be one of the applicable reasonings available to the Software.

An understanding of the interrelationships between a global meaning, a format factor meaning and practical meanings, which clarify and modify the scope of these meanings, is a powerful meaning programming tool. When a user presents an input to the Software which includes a term having a primary relationship to a Software meaning programming tool, the Software's knowing of this term's meaning could be immediate. As a result of this knowing, the Software can quickly, even instantly, acquire and utilize the needed data to program the task defined, in whole or in part, by the use of this term by a Software user.

In Summary:

In some embodiments, meaning is a key factor in determining the efficiency of the Software's programming of Software content. If a meaning is a comprehensive understanding, the Software's operation of it as a programming tool should be at least humanly instantaneous (≤5 ms).

Of note, in a key embodiment, the Software only uses the meaning requisite to complete a programming task at a point in time. The construction of meaning via global, form factor and practical data gives the Software an immediate path to the application of any part of a meaning as a programming tool.

Figure 45:
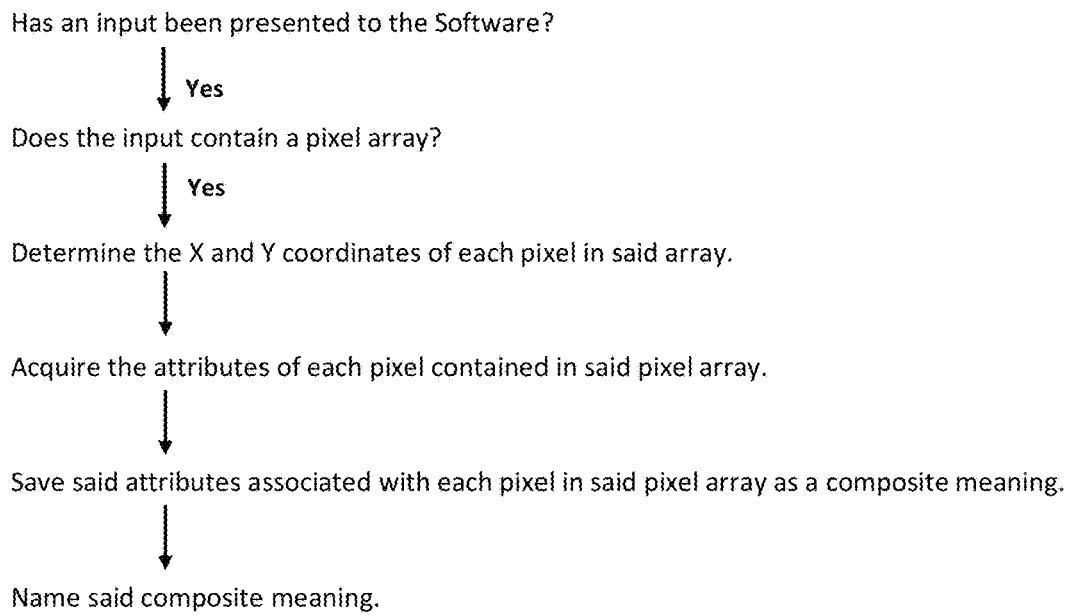
FIG. 45 is a flowchart defining the derivation of a composite meaning from an input in accordance with an embodiment of the invention.

FIG. 45 is a flowchart defining the derivation of a composite meaning from an input in accordance with an embodiment of the invention. In the flowchart depicted in FIG. 45, it is determined if an input has been presented to the Software. If the input has been presented to the Software, it is determined if the input contains a pixel array. If the input contains a pixel array, the X and Y coordinates of each pixel in said array are determined, the attributes of each pixel contained in said pixel array are acquired, and said attributes associated with each pixel in said pixel array are saved as a composite meaning. Said composite meaning is named.

Figure 46:
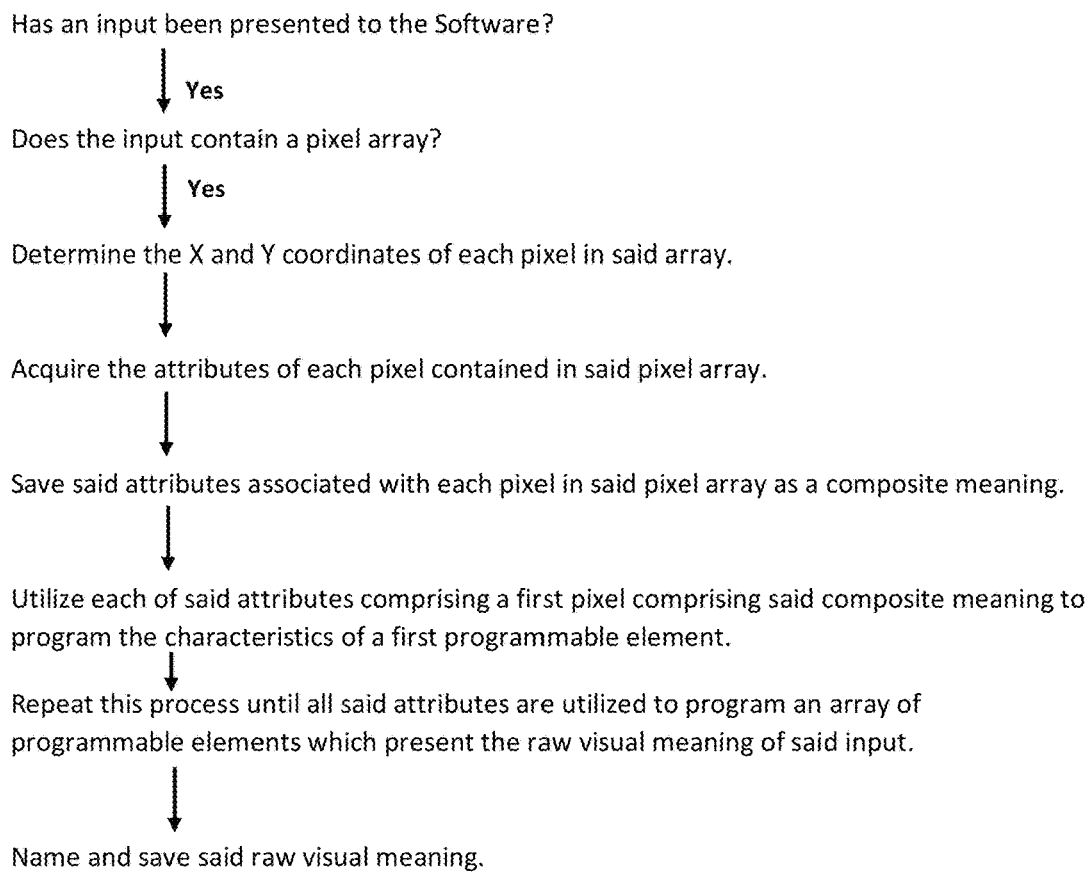
FIG. 46 is a flowchart defining the creation of a raw visual meaning in accordance with an embodiment of the invention.

FIG. 46 is a flowchart defining the creation of a raw visual meaning in accordance with an embodiment of the invention. In the flowchart depicted in FIG. 46, it is determined if an input has been presented to the Software. If the input has been presented to the Software, it is determined if the input contains a pixel array. If the input contains a pixel array, the X and Y coordinates of each pixel in said array are determined, the attributes of each pixel contained in said pixel array is acquired, and said attributes associated with each pixel in said pixel array are saved as a composite meaning. Each of said attributes comprising a first pixel comprising said composite meaning is utilized to program the characteristics of a first programmable element. This process is repeated until all said attributes are utilized to program an array of programmable elements which present the raw visual meaning of said input. Said raw visual meaning is named and saved.

FIG. 47 defines the analysis of pixel definitions to create a raw visual meaning which is further analyzed to acquire deeper meaning in accordance with an embodiment of the invention. In the flowchart depicted in FIG. 47, pixel definitions of a visualization input are acquired. These definitions are saved as a raw visual meaning. Said raw visual meaning is utilized to program one or more programmable elements. Said raw visual meaning is analyzed to acquire deeper meaning.

FIG. 48 is a flowchart defining the operations of reciprocal programming in accordance with an embodiment of the invention. In the flowchart depicted in FIG. 48, it is determined if a meaning exists in a Software environment. If a meaning exists in a Software environment, it is determined if this meaning has been operated by an input. If this meaning has been operated by an input, the meaning of the input which operates said meaning is determined. The meaning of said input is utilized to modify said meaning. The resulting meaning is saved as an operable meaning. It is determined if said operable meaning has been applied to program a target meaning. If said operable meaning has been applied to program a target meaning, it is determined if the target meaning has a meaning that is relevant to said operable meaning. If the target meaning has a meaning that is relevant to said operable meaning, the target meaning is modified with said operable meaning. Concurrently, or sequentially, the programing result of this meaning 5 is modified with the meaning of the target which is relevant to the operable meaning being used to program it.

Figure 49:
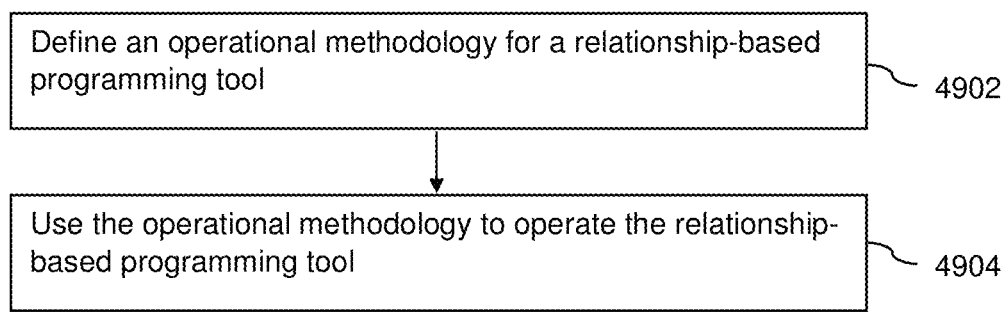
FIG. 49 is a flow diagram of a computer-implemented method in accordance with an embodiment of the invention.

FIG. 49 is a flow diagram of a computer-implemented method in accordance with an embodiment of the invention. At block 4902, an operational methodology for a relationship-based programming tool is defined. At block 4904, the operational methodology is used to operate the relationship-based programming tool.

What is claimed is:

1. A computer-implemented method comprising:
defining an operational methodology for a content that acts as a relationship-based programming tool by creating an equivalent for the content, wherein an operation of the equivalent for the content modifies a plurality of characteristics, relationships and meaning of the content; and
using the operational methodology to operate the relationship-based programming tool, wherein using the operational methodology to operate the relationship-based programming tool comprises creating an operable meaning for the relationship-based programming tool using the operation of the equivalent for the content and programming a target using the operable meaning, and wherein a meaning of the target, which is relevant to the operable meaning being used to program the target, modifies a result of the operable meaning's programming of the target.

2. The computer-implemented method of claim 1, wherein the operational methodology is user-specific.

3. A non-transitory computer-readable storage medium containing program instructions, wherein execution of the program instructions by one or more processors causes the one or more processors to perform steps comprising:
- defining an operational methodology for content that acts as a relationship-based programming tool by creating an equivalent for the content, wherein an operation of the equivalent for the content modifies plurality of characteristics, relationships and meaning of the content; and
- using the operational methodology to operate the relationship-based programming tool, wherein using the operational methodology to operate the relationship-based programming tool comprises creating an operable meaning for the relationship-based programming tool using the operation of the equivalent for the content and programming a target using the operable meaning, and wherein a meaning of the target, which is relevant to the operable meaning being used to program the target, modifies a result of the operable meaning's programming of the target.

4. A computer system, the computer system comprising:

memory; and at least one processor configured to:
- define an operational methodology for a content that acts as a relationship-based programming tool by creating an equivalent for the content, wherein an operation of the equivalent for the content modifies a plurality of characteristics, relationships and meaning of the content; and use the operational methodology to operate the relationship-based programming tool by creating an operable meaning for the relationship-based programming tool using the operation of the equivalent for the content and programming a target using the operable meaning, and wherein a meaning of the target, which is relevant to the operable meaning being used to program the target, modifies a result of the operable meaning's programming of the target.

* * * * *